United States Patent
Zhu et al.

(10) Patent No.: US 7,508,472 B2
(45) Date of Patent: Mar. 24, 2009

(54) GENERAL FILM COMPENSATED REFLECTIVE LCD HAVING LC LAYER WITH MIDDLE LAYER SATISFYING A PREDETERMINED RELATIONSHIP BETWEEN PHASE RETARDATION AND HALF RESIDUAL PHASE DEPENDING ON AN EXTERNAL ELECTRIC FIELD

(75) Inventors: Xinyu Zhu, Orlando, FL (US); Shin-Tson Wu, Oviedo, FL (US)

(73) Assignee: TPO Displays Corp., Miao-Li County (TW)

( * ) Notice: Subject to any disclaimer, the term of this patent is extended or adjusted under 35 U.S.C. 154(b) by 585 days.

(21) Appl. No.: 11/025,074

(22) Filed: Dec. 30, 2004

(65) Prior Publication Data

US 2005/0237456 A1    Oct. 27, 2005

(30) Foreign Application Priority Data

Apr. 27, 2004  (TW) ............................... 93111697 A

(51) Int. Cl.
  *G02F 1/1335*  (2006.01)
(52) U.S. Cl. ........................... 349/117; 349/96; 349/119
(58) Field of Classification Search ................. 349/117, 349/96, 119
  See application file for complete search history.

(56) References Cited

U.S. PATENT DOCUMENTS

| 5,933,207 | A | 8/1999 | Wu |
| 6,295,109 | B1 | 9/2001 | Masumi et al. |
| 6,731,360 | B2 * | 5/2004 | Roosendaal et al. ......... 349/113 |
| 7,006,173 | B1 * | 2/2006 | Hiyama et al. ................ 349/96 |

* cited by examiner

*Primary Examiner*—David Nelms
*Assistant Examiner*—John Heyman
(74) *Attorney, Agent, or Firm*—MH2 Technology Law Group LLP

(57) ABSTRACT

A liquid crystal display having at least one of high contrast ratio, high reflectance, and low color dispersion is disclosed. Based on the total boundary residual retardation, the corresponding compensation film and polar conditions may be calculated. Using the compensation film and polarizer conditions, a general film compensated reflective twisted-nametic liquid crystal display (GF-RTN-LCD) may be obtained.

9 Claims, 36 Drawing Sheets

GENERAL FILM COMPENSATED REFLECTIVE LCD HAVING LC LAYER WITH MIDDLE LAYER SATISFYING A PREDETERMINED RELATIONSHIP BETWEEN PHASE RETARDATION AND HALF RESIDUAL PHASE DEPENDING ON AN EXTERNAL ELECTRIC FIELD

DESCRIPTION OF THE INVENTION

1. Field of the Invention

This invention relates to liquid crystal display devices, and more particularly, to reflective and transflective liquid crystal display devices using a phase compensation film.

2. Background of the Invention

Reflective liquid crystal displays (RLCDs) provide several advantages over conventional transmissive LCDs, such as low power consumption, light weight, and good outdoor reliability. Originally, conventional transmissive twisted-nematic (TN) LCDs and super-twisted-nemetic (STN) LCDs were expanded to reflective capability by replacing one polarizer with a reflective polarizer. However, incident light passes through the polarizer four times in total, resulting in a low light efficiency. Moreover, because the reflective polarizer is placed outside of the glass substrate, serious parallax occurs during viewing from oblique angles, greatly affecting display quality, for example for high resolution reflective LCDs.

To solve the aforementioned issues, many reflective LCDs with a single polarizer have been proposed. The basic configuration of these reflective LCD includes a polarizer, a liquid crystal layer, and a reflector. Because light is reflected back by the reflector and incident light passes through the polarizer twice, a reflective LCD with a single polarizer is equivalent to a transmissive LCD with a two-parallel-polarizer configuration, except for the double pass in the liquid crystal layer. However, the conventional transmissive 90° TN-LCD does not work for the single-polarizer reflective LCD because the wave guiding effect leads to the same states with both voltage-on and voltage-off.

In principle, the phase retardation (dΔn) of a reflective LCD with a single-polarizer should be approximately half that of a transmissive display because of the double pass of light. U.S. Pat. No. 5,933,207 (Wu), the entirety of which is hereby incorporated by reference, discloses a mixed twisted-nematic (MTN) mode to solve these problems by using a polarizer, a quarter wave film, a TN-LC layer, and a reflector for direct-view display. These components are applied successfully to 90° MTN cells although the maximum light efficiency is only 88% because of complete boundary compensation. However, at twisted angles less than 90°, the contrast ratio drops because boundary compensation is incomplete. U.S. Pat. No. 6,295,109 B1 (Masumi et. al.), the entirety of which is hereby incorporated by reference, discloses a λ/4-α film to compensate for the residual phase at the voltage-on state, where α is the residual phase of the TN-LC cell in the voltage-on state. However, since the residual phase in the voltage-on state is not a pure birefringence effect, the λ/4-α film does not completely compensate the residual phase. Some publications also propose a reflective LCD mode with a single polarizer, as described in a monograph entitled "Reflective Liquid Crystal Displays" (S. T. Wu and D. K. Yang, Wiley, New York, 2001). The critical issue in these cases is the incomplete boundary compensation resulting in low contrast ratio for reflective and transflective LCDs.

FIGS. 1A and 1B show the electro-optical performance of a conventional 75° MTN-LCD with a cell gap d=3.5 µm. In a voltage-off state, reflectance reaches unity. The light leakage in the dark state, however, is relatively high due to the incomplete surface compensation. The reflective mode contrast ratio is 86:1 even when the driving voltage reaches 4V. If the operating voltage is reduced to 3V, the corresponding contrast ratio is 30:1, which is inadequate for most display applications.

SUMMARY OF THE INVENTION

According to various embodiments, there is provided a liquid crystal display, comprising: a liquid crystal cell comprising a liquid crystal layer, and having a twisted angle φ and a half residual phase α; a compensation film disposed on the liquid crystal cell, and having a phase retardation δ in the range of $(\delta_0-0.2\pi) \leq \delta \leq (\delta_0+0.2\pi)$ and a slow axis angle θ in the range of $0° \leq \theta \leq 180°$; and a polarizer disposed on the compensation film and having a polarizer angle β in the range of $(\beta_0-20°+n\cdot 90°) \leq \beta \leq (\beta_0+20°+n\cdot 90°)$; wherein the phase retardation $\delta_0$ satisfies the following relation:

$$\delta_0 = \operatorname{atan}\left(\frac{\sin^2\phi + \cos 2\alpha \cos^2\phi}{\sin\alpha \sin 2\theta \sin 2\phi + \sin 2\alpha \cos 2\theta \cos^2\phi}\right),$$

and n is an integer with $\beta_0$ satisfies the following relation:

$$\beta_0 = \theta + \frac{1}{2}\operatorname{atan}\left(-\frac{\sin^2\phi + \cos 2\alpha \cos^2\phi}{\sin\delta_0(\sin\alpha\cos 2\theta\sin 2\phi - \sin 2\alpha\sin 2\theta\cos^2\phi)}\right).$$

The liquid crystal cell may further comprise a first substrate and a second substrate, between which the liquid crystal layer may be interposed. The first substrate may comprise at least one of an opposing reflective substrate and a transflective substrate. A broadband circular polarizer may be disposed beneath the transflective substrate.

The total residual phase of the liquid crystal cell may be 2α and $\alpha = 2\pi\cdot\psi/\lambda$, wherein ψ may be the residual retardation of each boundary sub-layer and λ may be the wavelength of light.

The disclosed liquid crystal display may possess at least one of high contrast ratio, low operating voltage, high brightness, and limited color dispersion.

Additional advantages of the invention will be set forth in part in the drawings and description which follows, and in part will be obvious from the description, or may be learned by practice. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE DRAWINGS

The invention will become more fully understood from the detailed description given hereinbelow and the accompanying drawings, given by way of illustration only and thus not intended to be limitative.

DESCRIPTION OF THE INVENTION

Figure 1A:
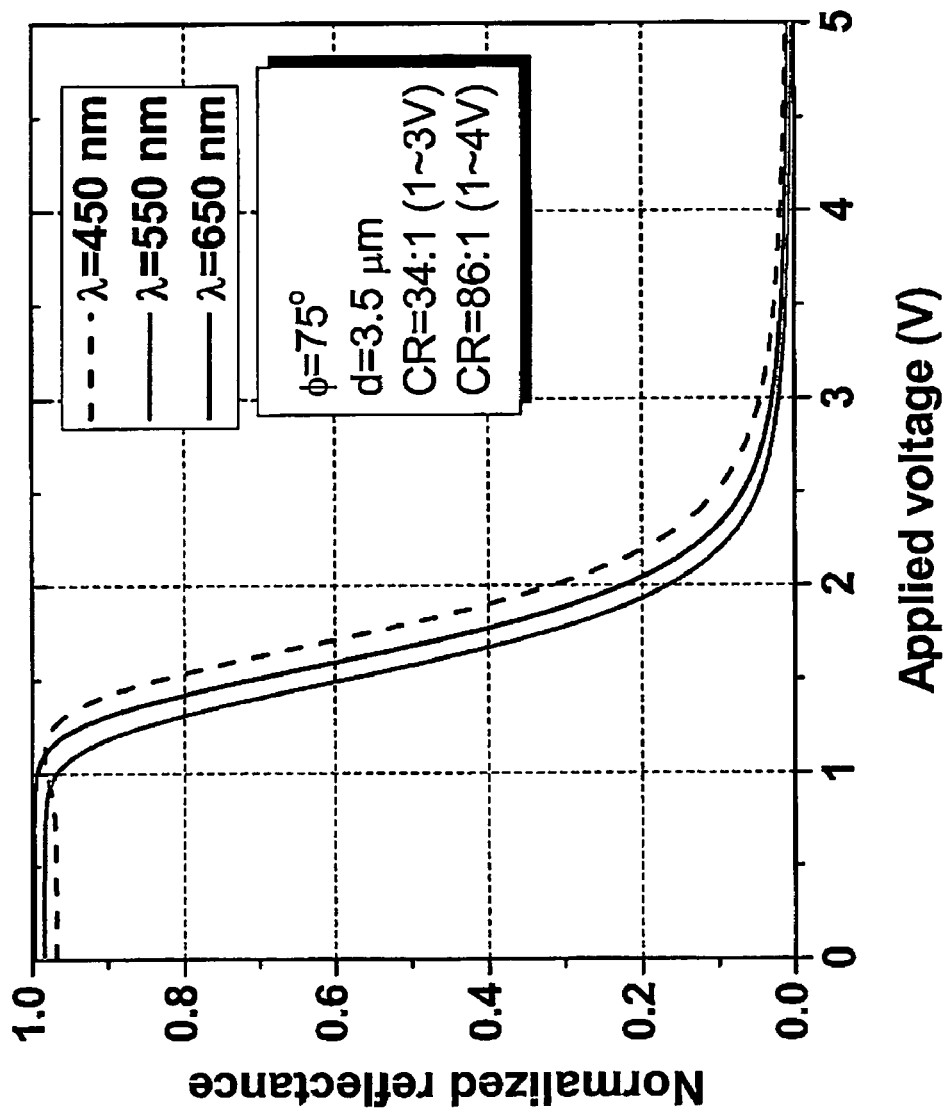
FIG. 1A is a graph illustrating the voltage dependence reflectance of a conventional LCD using a broadband circular polarizer, wherein φ=75° and d=3.5 µm.
Figure 1B:
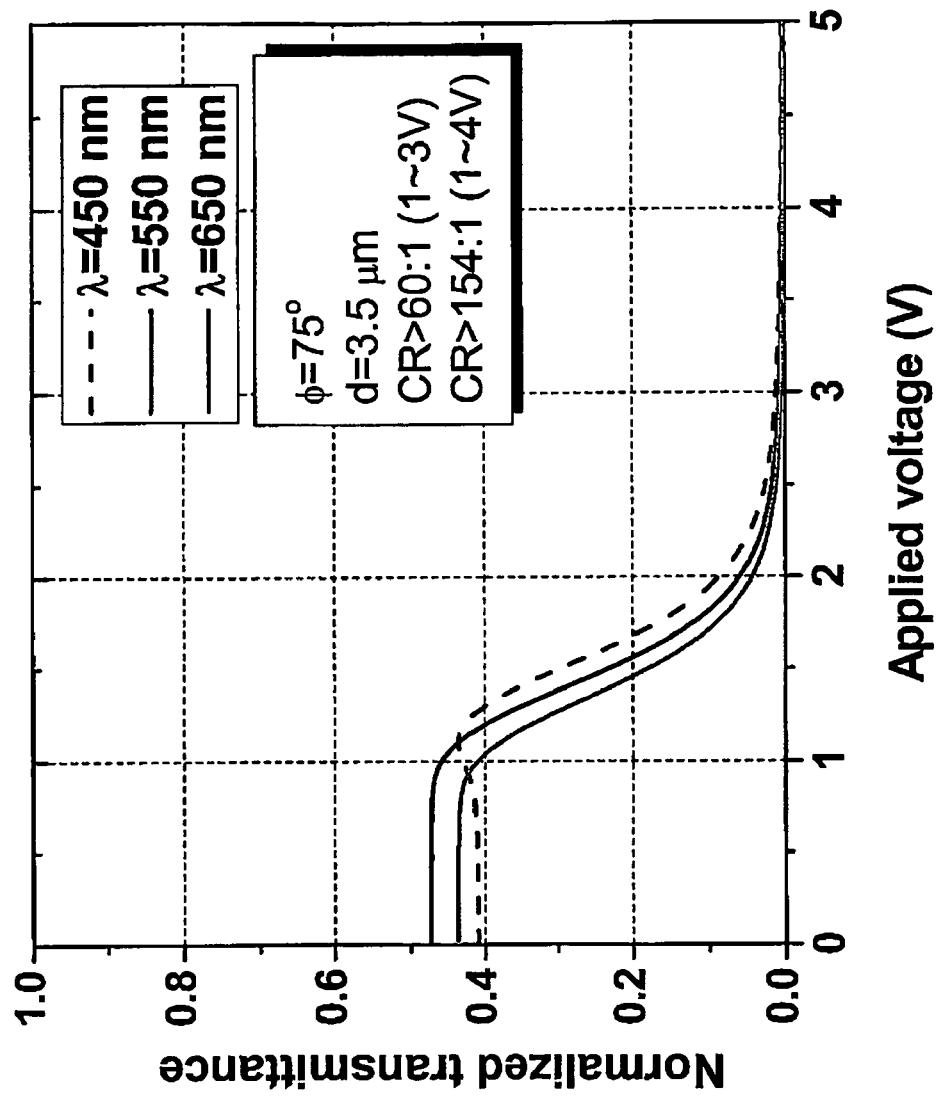
FIG. 1B is a graph illustrating the voltage dependence transmittance of a conventional LCD using a broadband circular polarizer, wherein φ=75° and d=3.5 μm.
Figure 2:
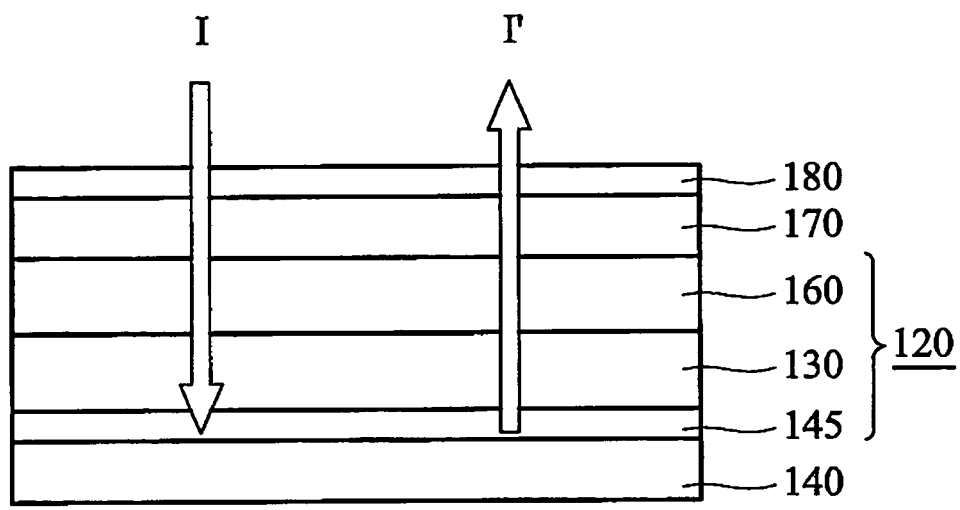
FIG. 2 shows the structure of a general film compensated reflective twisted nematic liquid crystal display (GF-RTN-LCD) according to various disclosed embodiments.
Figure 3:
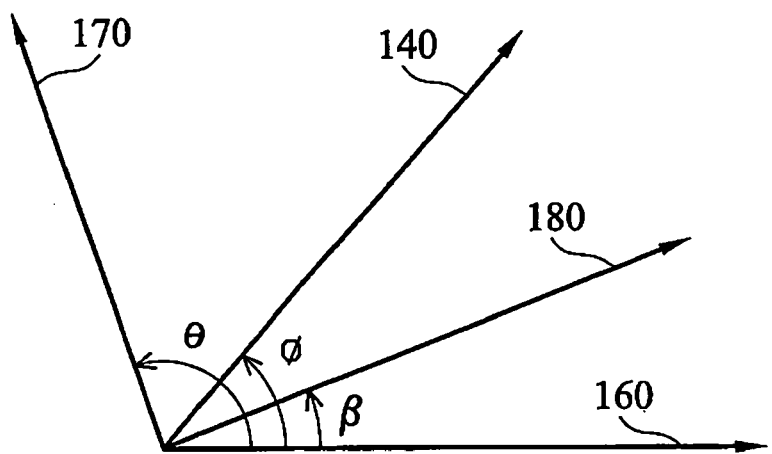
FIG. 3 shows the coordinates of the configuration of the GF-RTN-LCD according to embodiments.

The disclosure provides an LCD device structure design for achieving at least one of higher contrast ratio, lower color dispersion and higher brightness. FIG. 2 shows a schematic diagram of the structure of a general film compensated reflective twisted nemetic liquid crystal display (GF-RTN-LCD). GF-RTN-LCD 100 comprises a polarizer 180, a compensation film 170, a liquid crystal cell 120 comprising a first substrate 140 and a second substrate 160, and a TN-LC layer 130 interposed therebetween. The first substrate 140 may have a reflector 145. Incident light I passes through the liquid crystal cell, and is reflected by reflector as reflective light I'. Alternatively, the first substrate 140 can be a transflector. FIG. 3 shows the coordinates of the configuration of GF-RTN-LCD 100 according to embodiments. Based on the rubbing direction of second substrate 160, i.e., substrate 160 on the viewer's side, polarizer's 180 transmission axis may be oriented at an angle β in the range of $(\beta_0-20°+n\cdot90°) \leq \beta \leq (\beta_0+20°+n\cdot90°)$ and the slow axis of the compensation film 170 may be at an angle θ in the range of $0° \leq \theta \leq 180°$. The twisted angle of the TN-LC layer 130 may be φ. All of these angles are defined as positive in a counterclockwise direction and negative in a clockwise direction.

Figure 4:
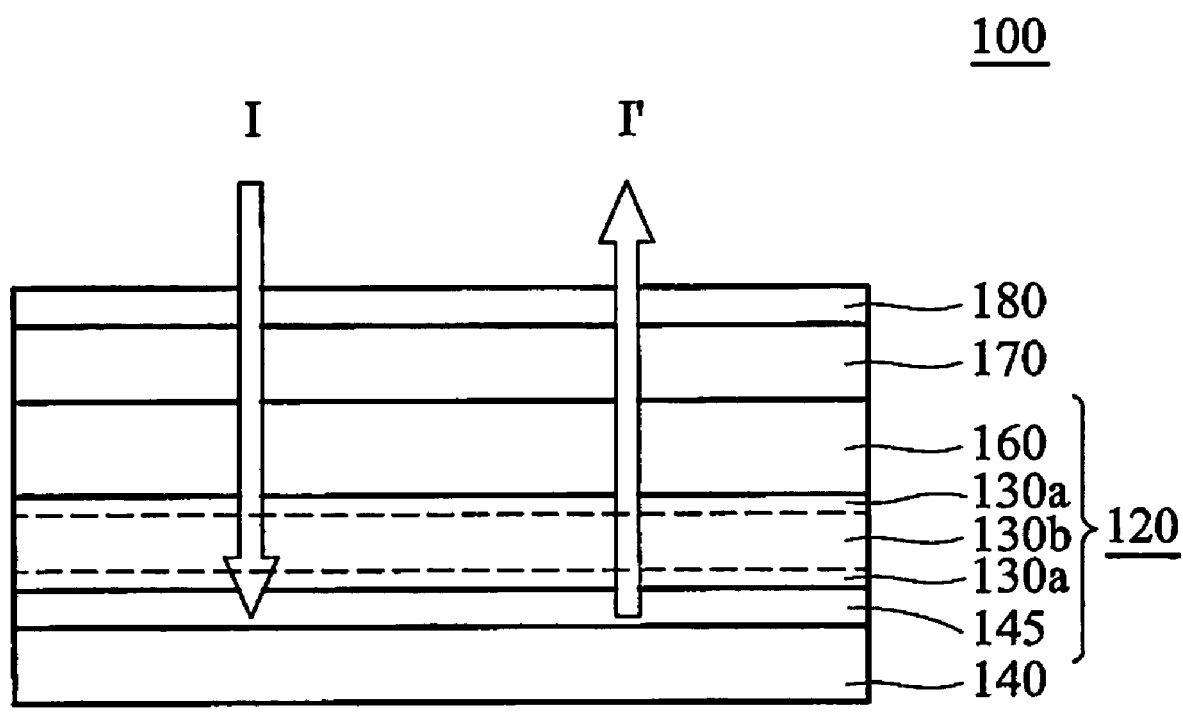
FIG. 4 is a schematic diagram showing a two-sublayer model of the GF-RTN-LCD at high voltage state.
Figure 5A:
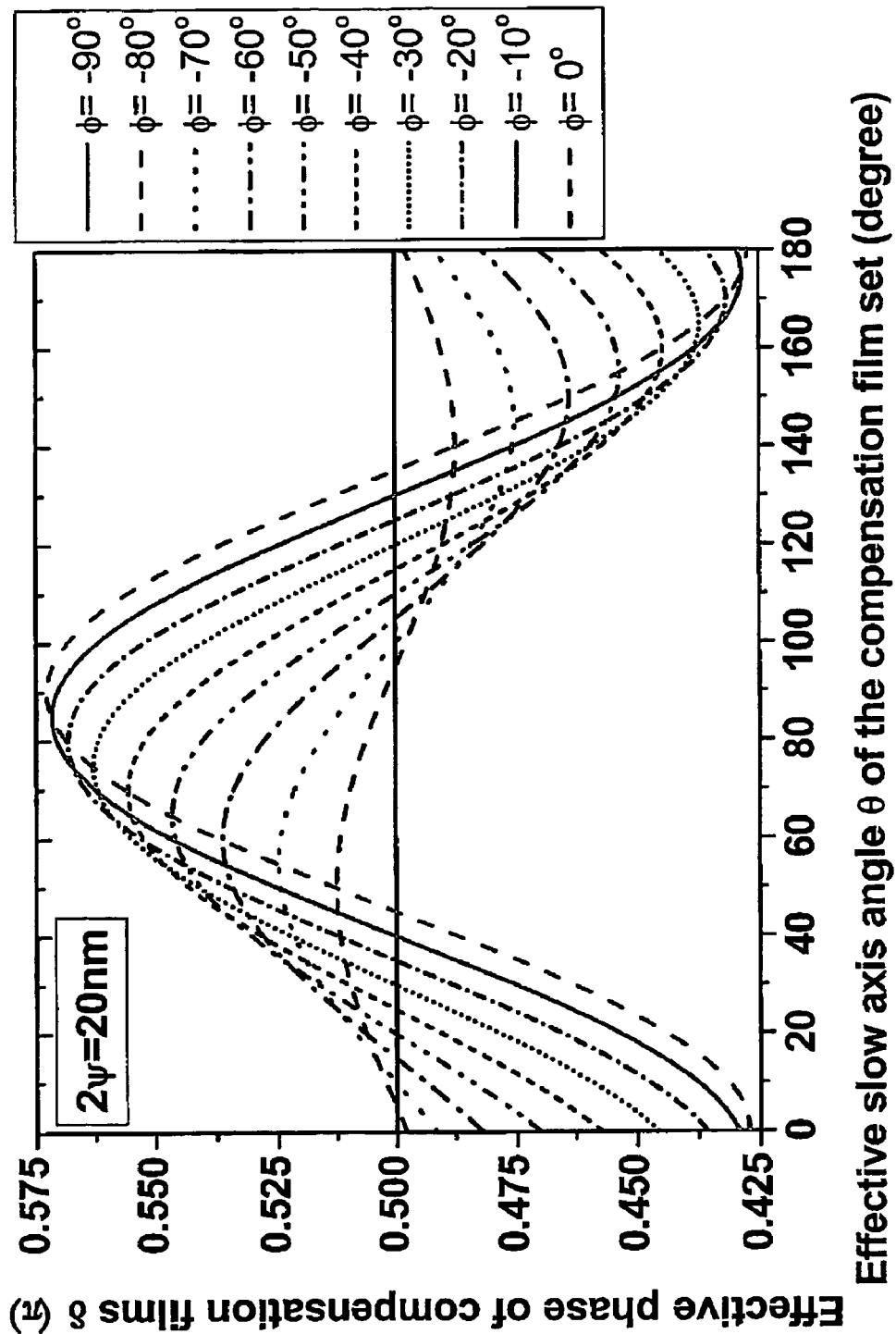
FIGS. 5A-5B show the relationship between phase retardation (δ) of the compensation film and its slow axis angle θ for different twist angles φ under residual retardations 2ψ=20 nm.
Figure 5B:
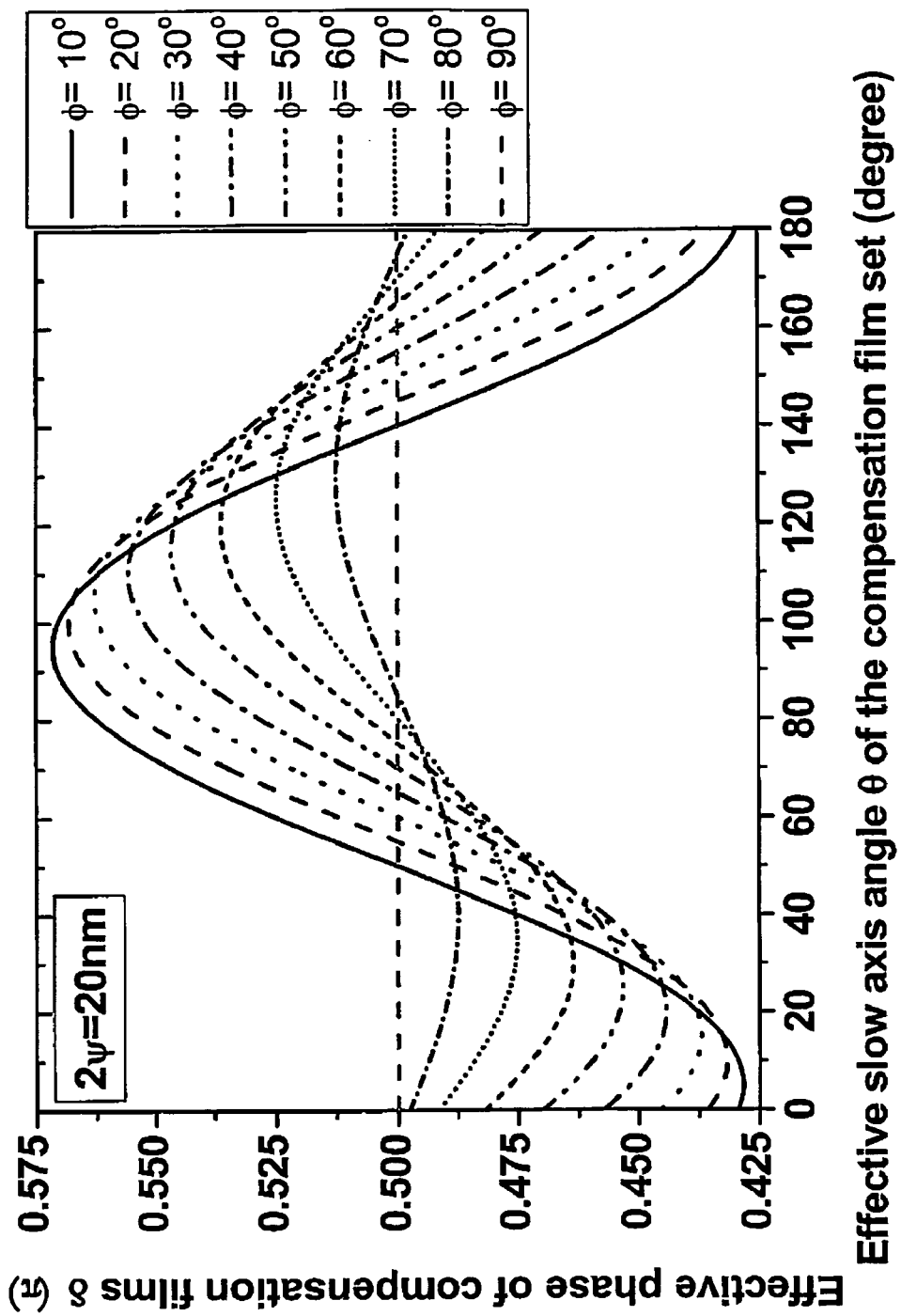
Figure 6A:
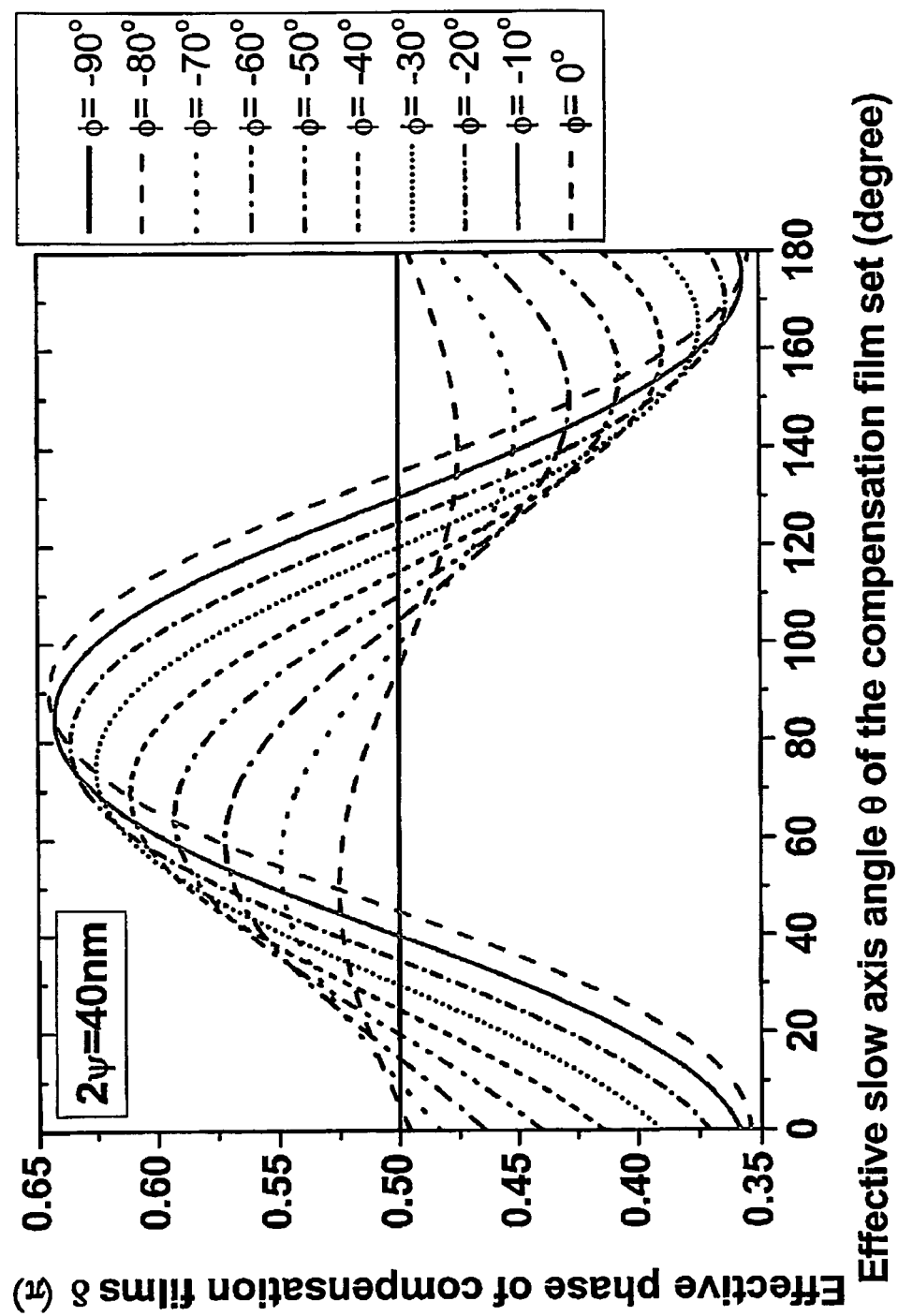
FIGS. 6A-6B show the relationship between phase retardation (δ) of the compensation film and its slow axis angle θ for different twist angles φ under residual retardations 2ψ=40 nm.
Figure 6B:
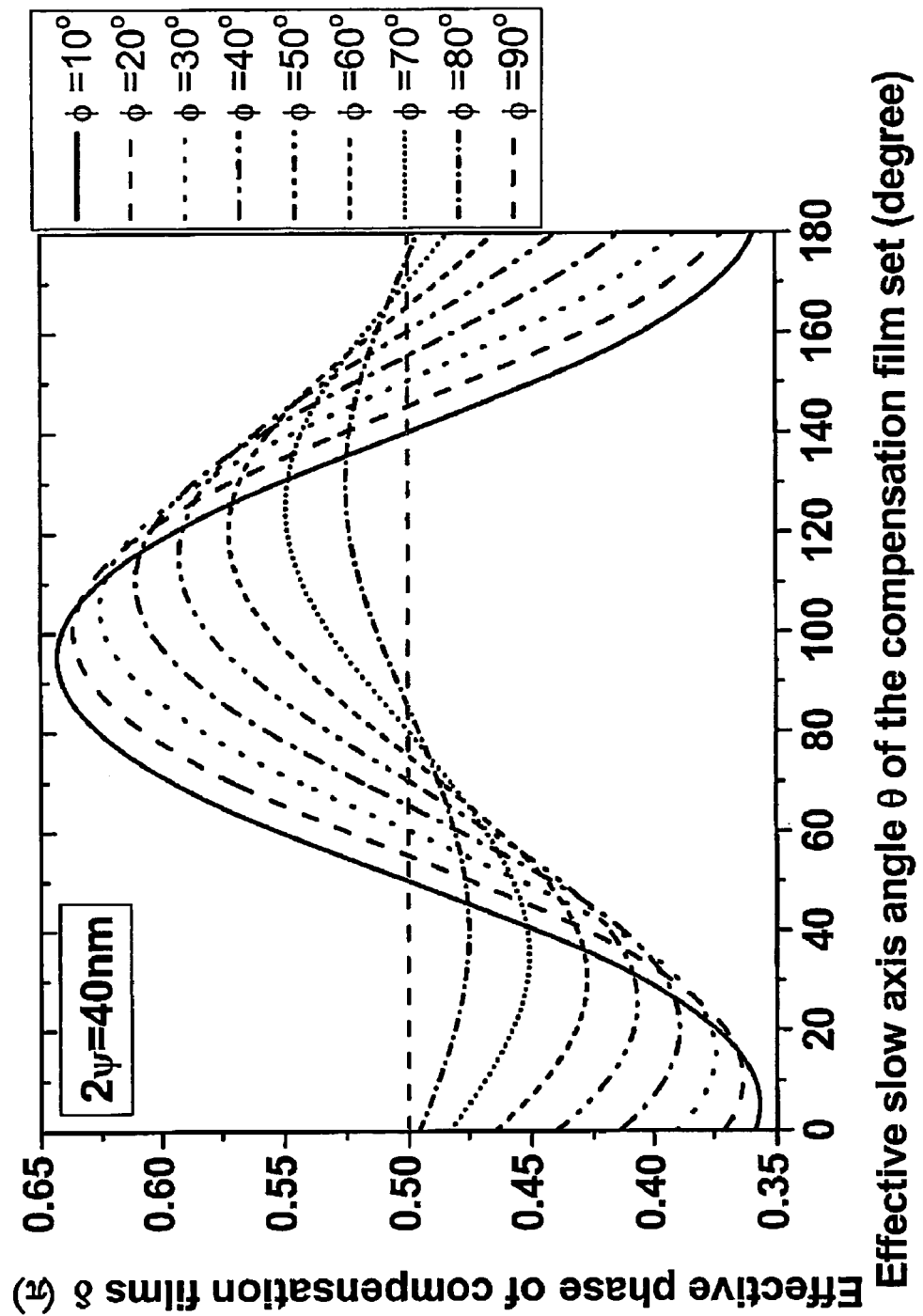
Figure 7A:
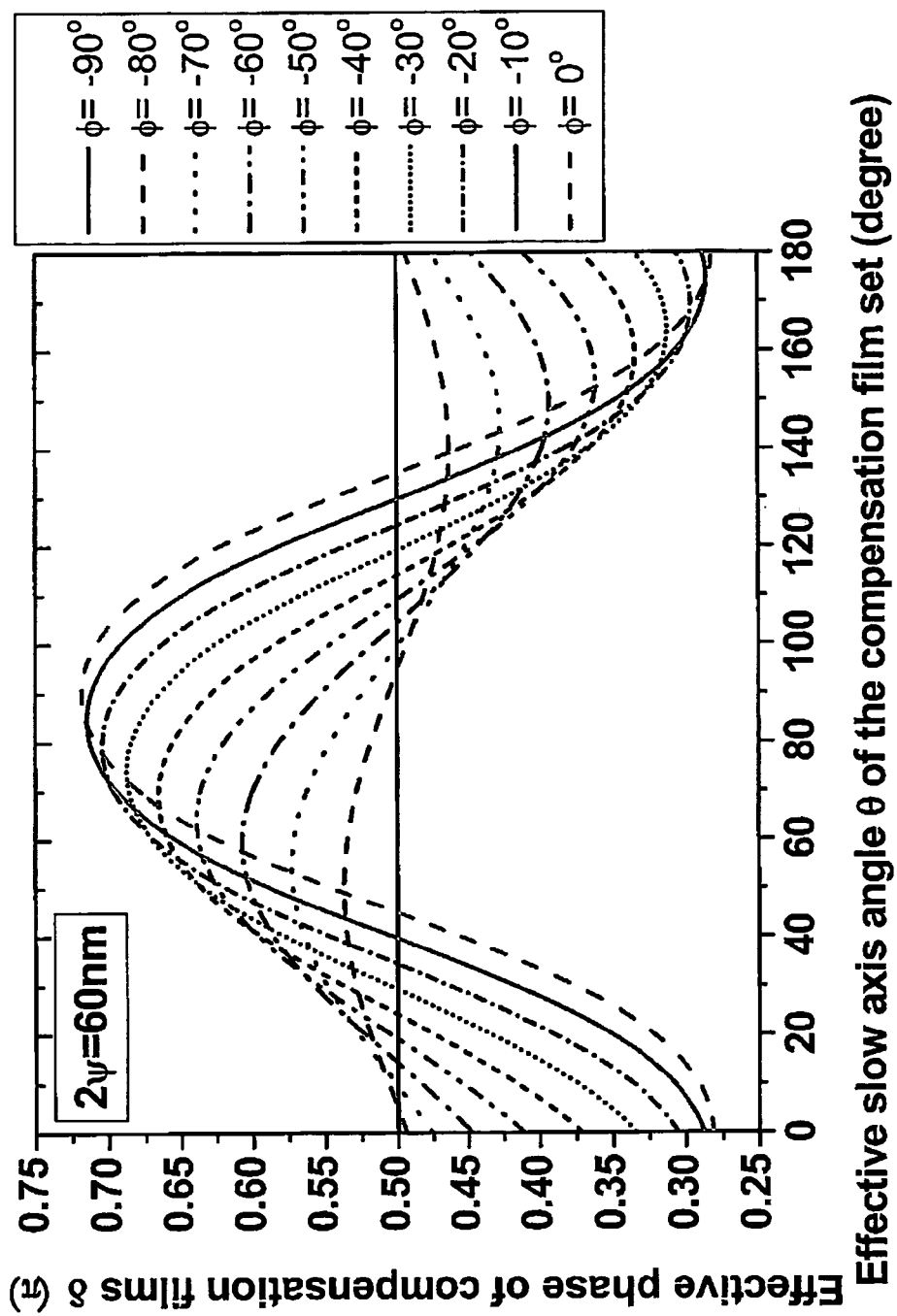
FIGS. 7A-7B show the relationship between phase retardation (δ) of the compensation film and its slow axis angle θ for different twist angles φ under residual retardations 2ψ=60 nm.
Figure 7B:
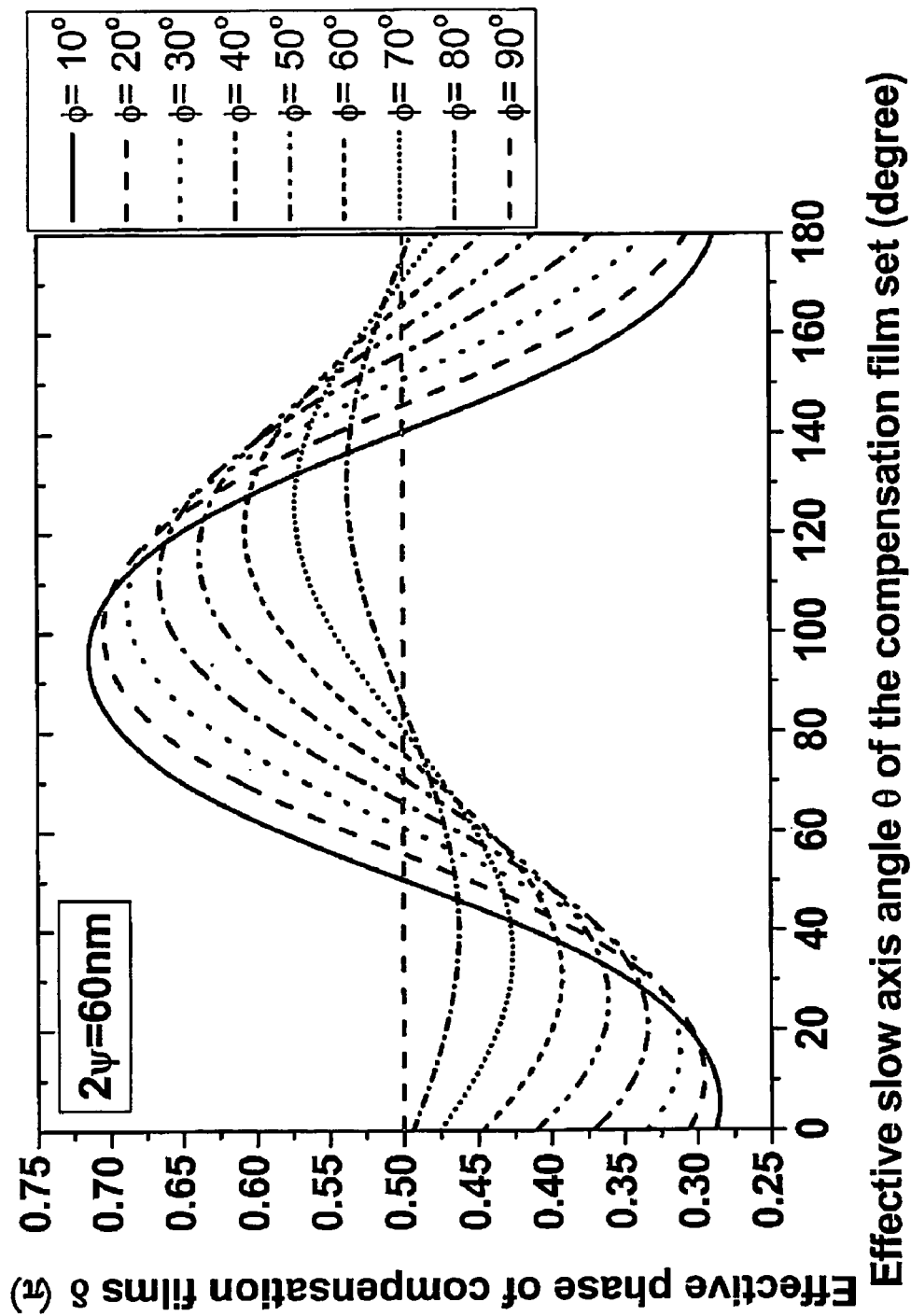
Figure 8A:
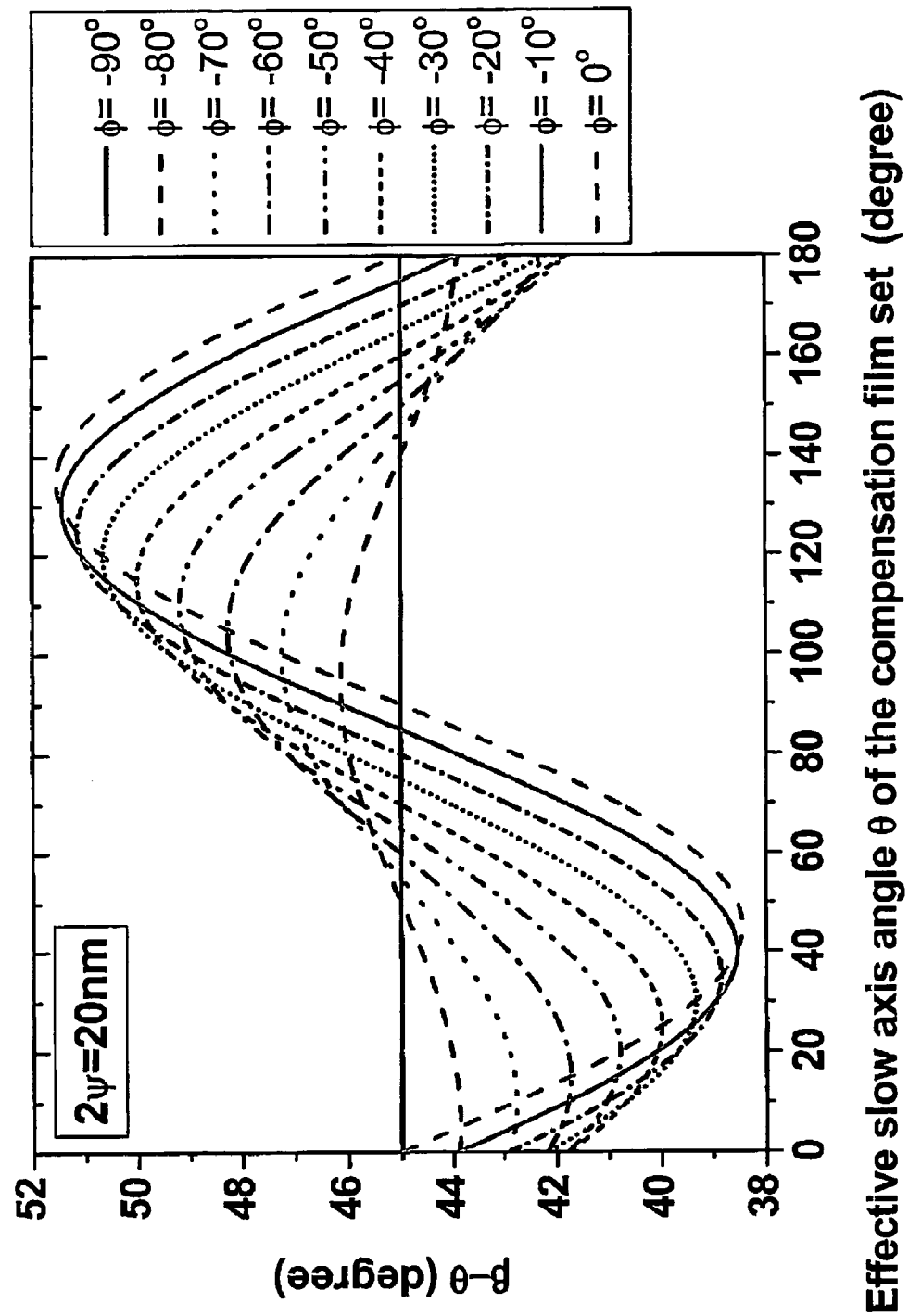
FIGS. 8A-8B show the relationship between the relative polarizer angle β-θ and the slow axis angle θ of the compensation film for different twist angles φ under residual retardations 2ψ=20 nm.
Figure 8B:
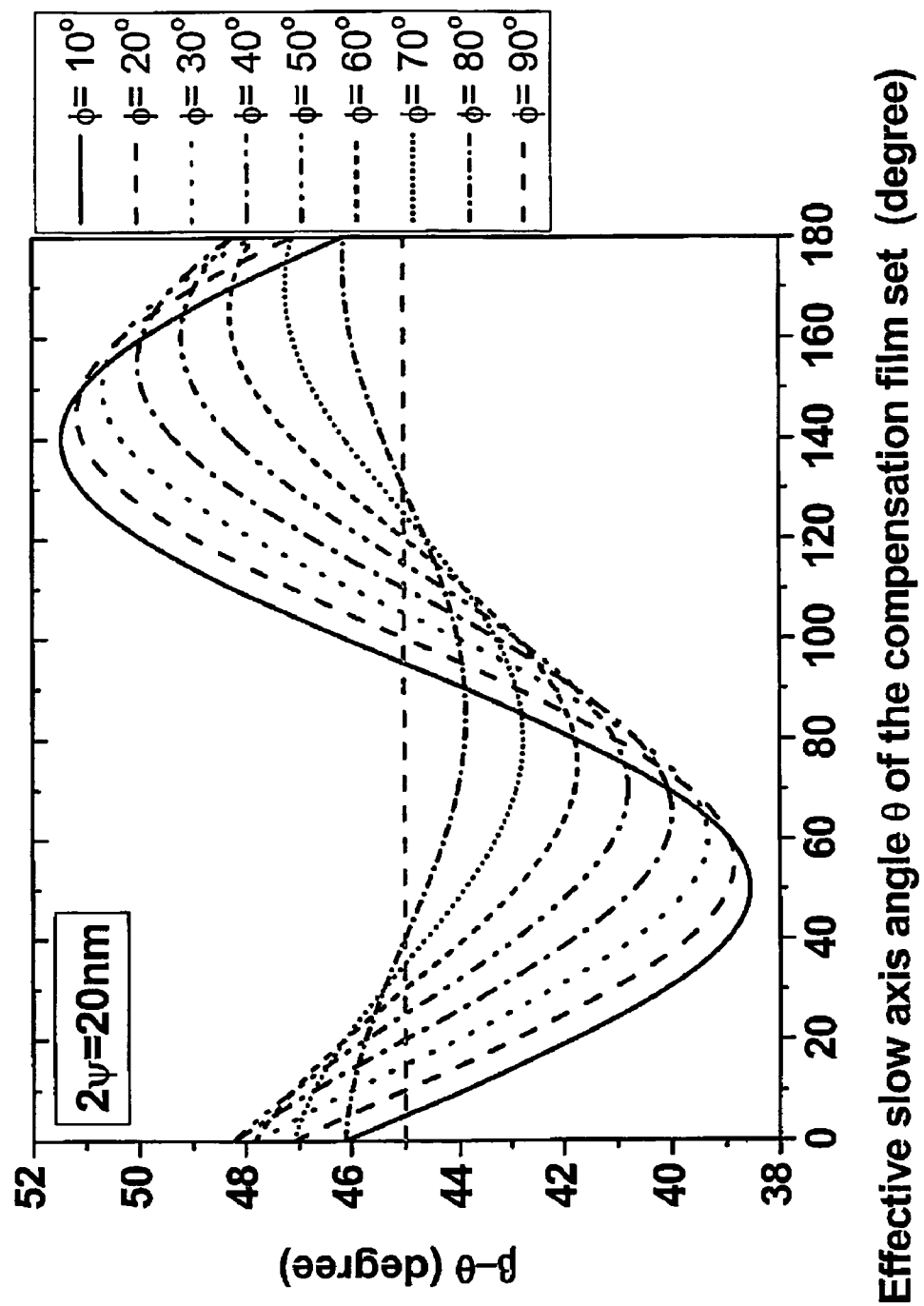
Figure 9A:
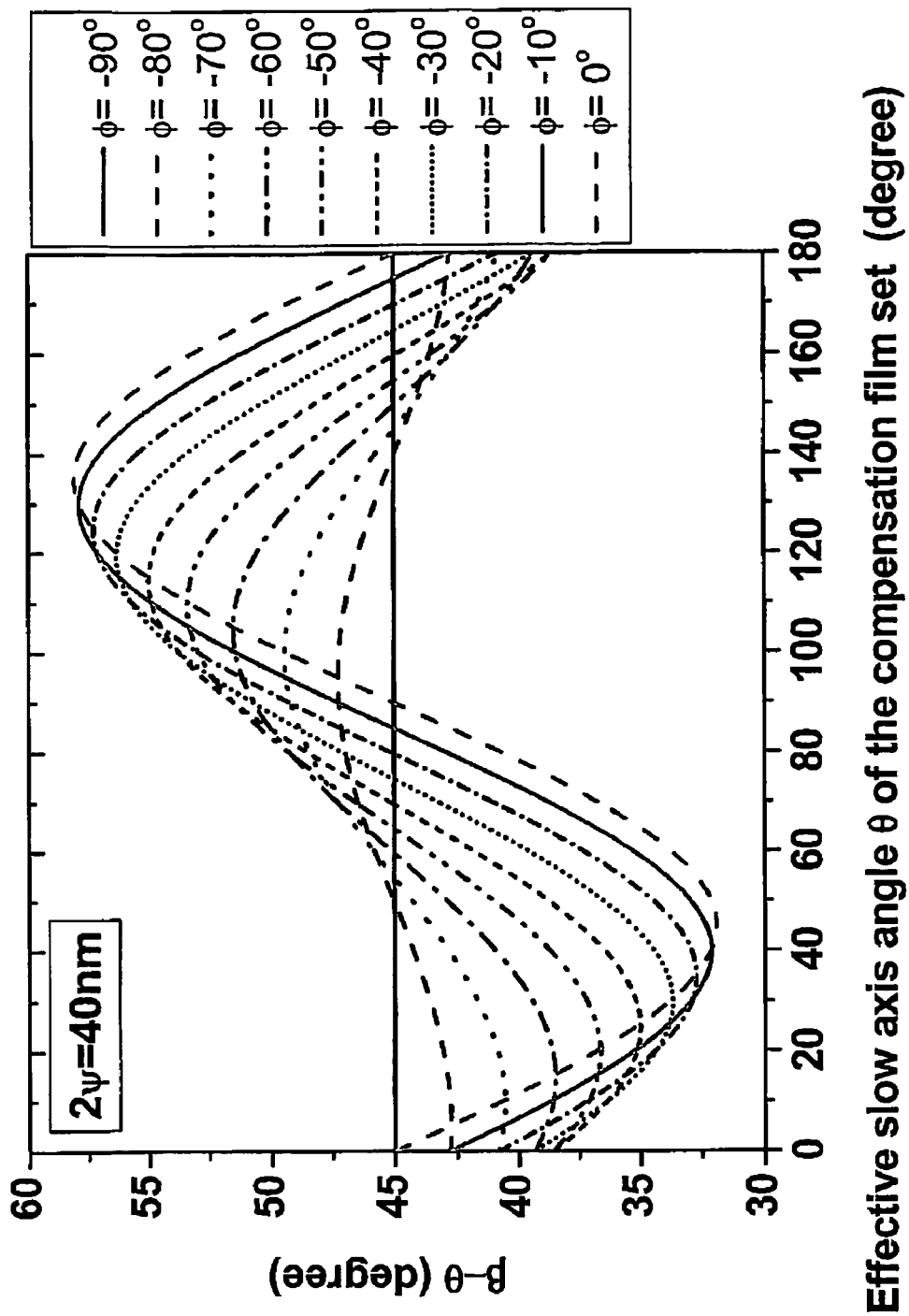
FIGS. 9A-9B show the relationship between the relative polarizer angle β-θ and the slow axis angle θ of the compensation film for different twist angles φ under residual retardations 2ψ=40 nm.
Figure 9B:
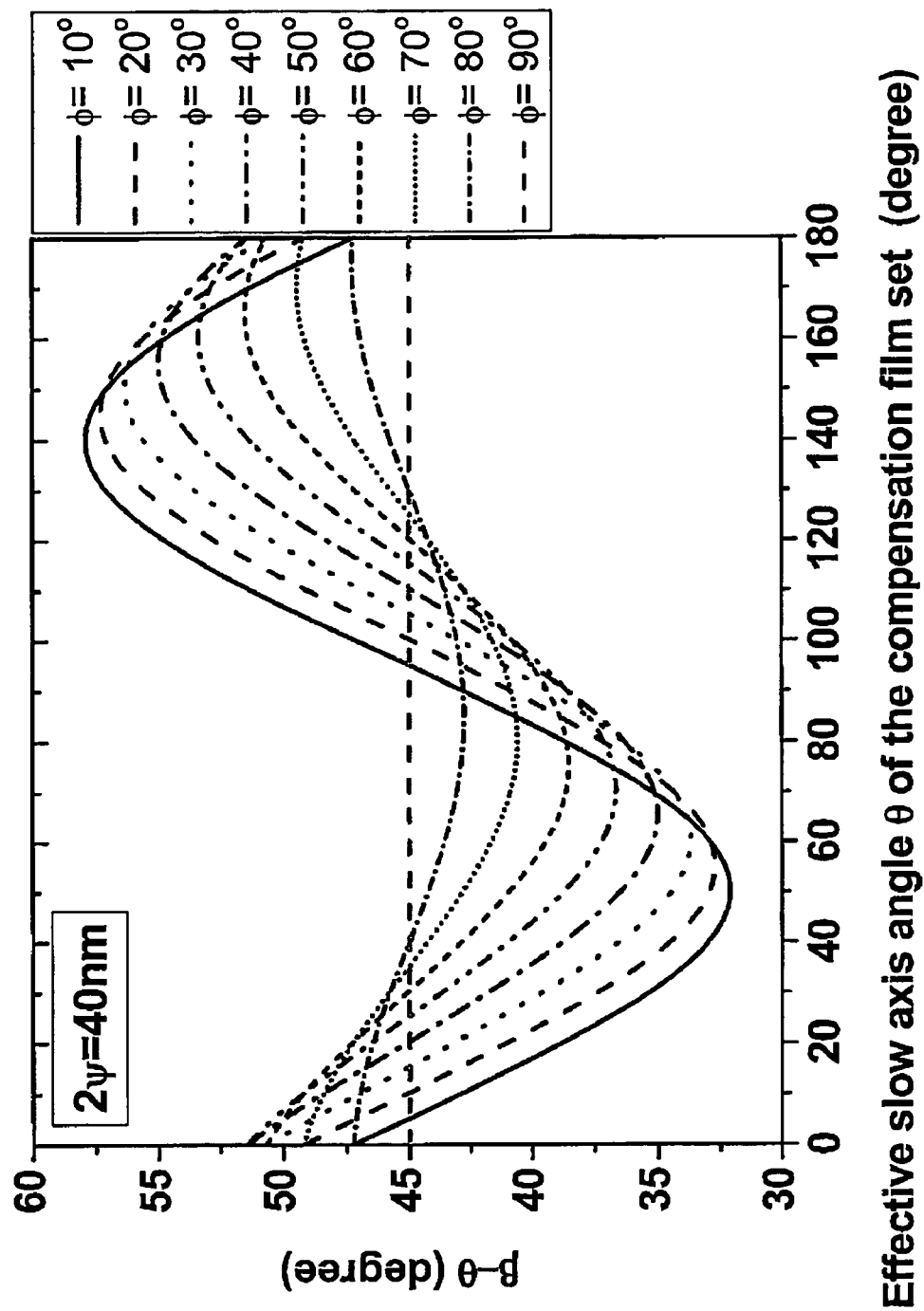
Figure 10A:
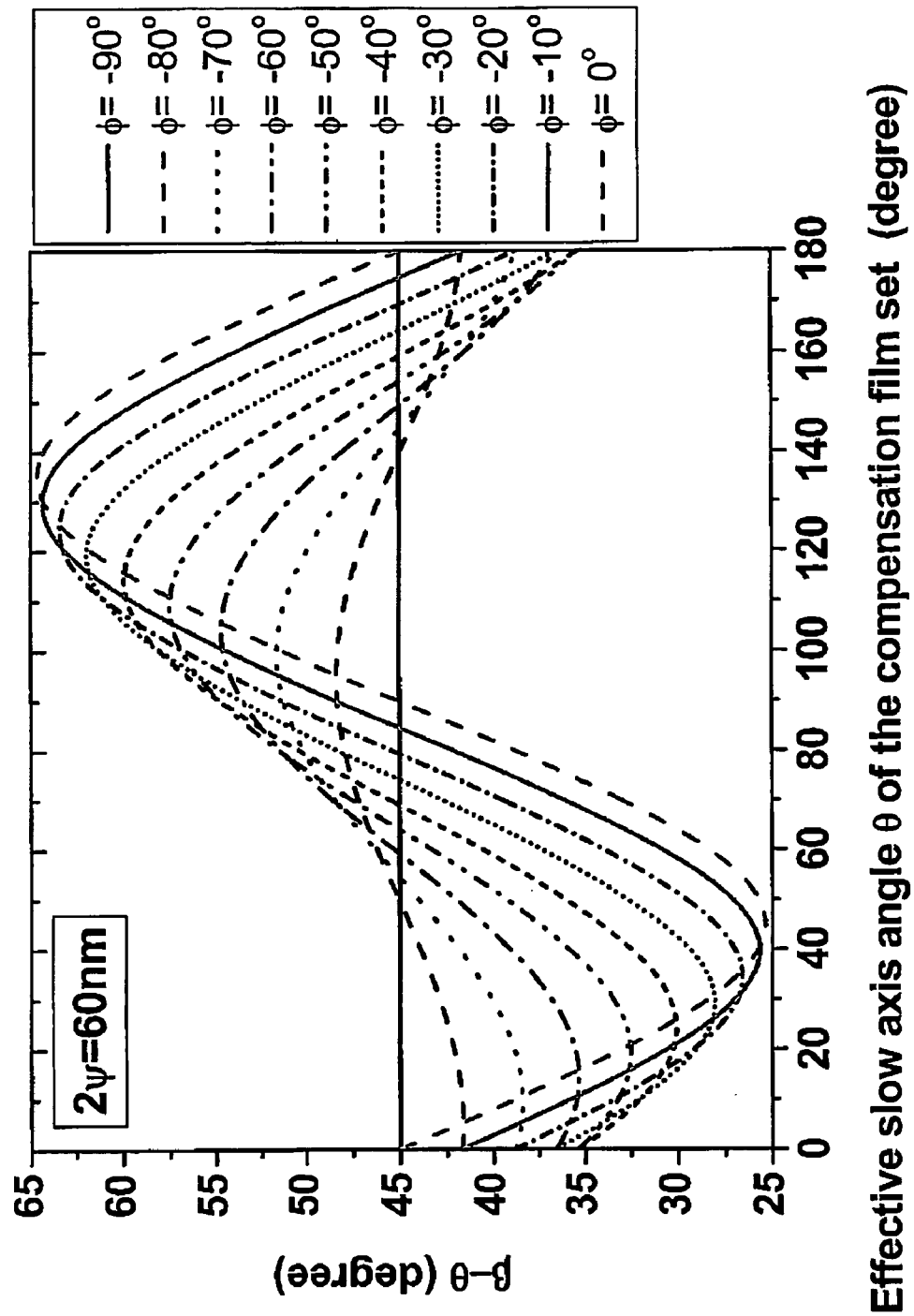
FIGS. 10A-10B show the relationship between the relative polarizer angle β-θ and the slow axis angle θ of the compensation film for different twist angles φ under residual retardations 2ψ=60 nm.
Figure 10B:
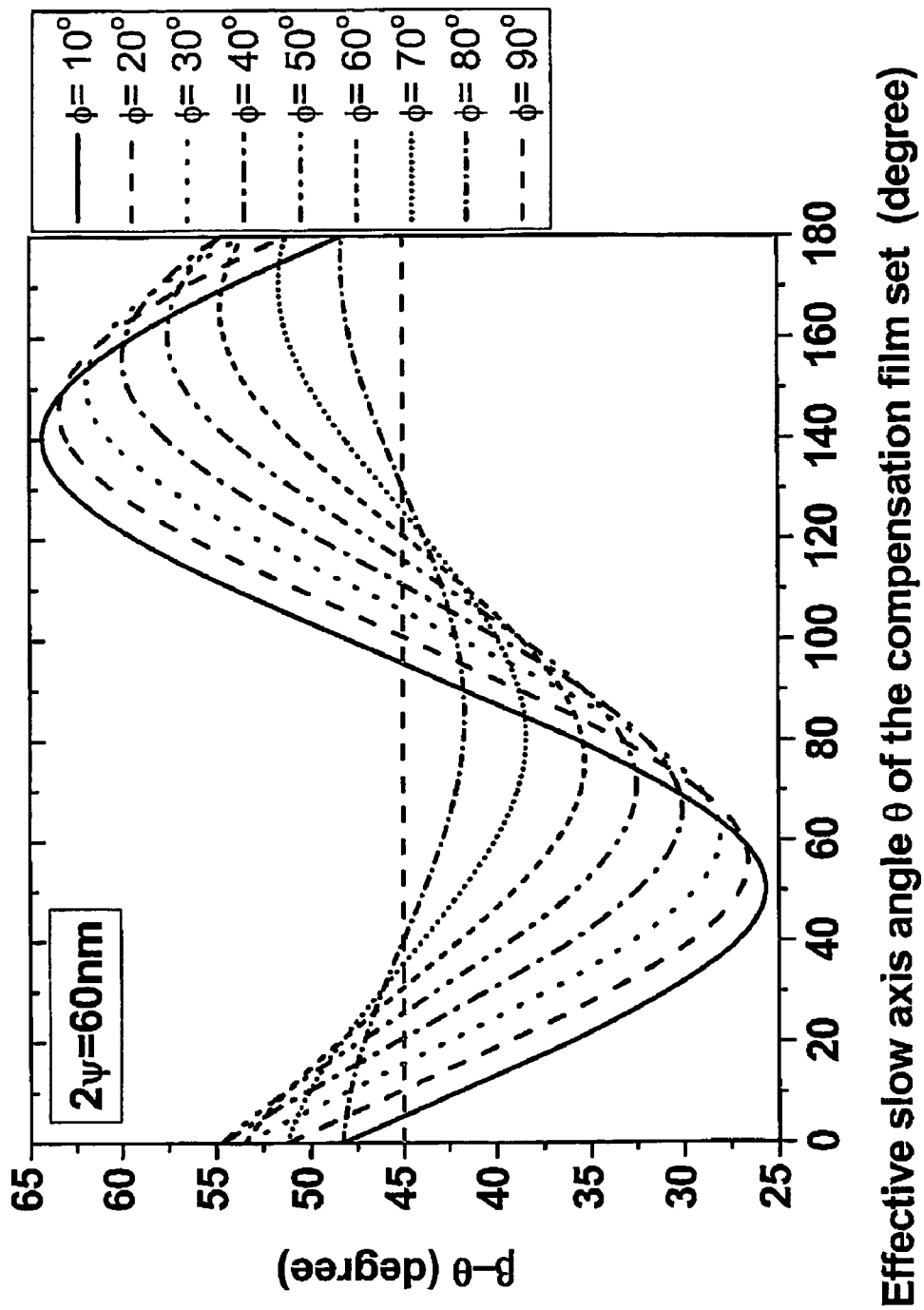

A two layer model may be first introduced. In a TN-LC cell with twisted angle of φ and positive dielectric anisotropic liquid crystal materials, when sufficient voltage is applied to the cell, the middle layers of the liquid crystal cell may be aligned along an electric field direction. However, the boundary layers of the liquid crystal cell may suffer little disturbance because of strong surface anchoring. Thus, two, thin boundary layers may be formed in a high voltage state, as shown in FIG. 4. One sub-layer 130a may be located near a second substrate 160 and another sub-layer 130a may be near the first substrate 140 (reflector). These boundary layers 130a can be treated as two uniaxial layers with twisted angle φ, as a two-layer model. For a given LC material, the residual retardation of each sub-layer may be inversely proportional to the driving voltage.

Based on the two-layer model shown in FIG. 4, the electro-optic performance of a reflective TN-LC cell with twisted angle φ and positive dielectric anisotropic LC material may be analyzed. If the pre-tilt angle for the substrate is the same, then half residual phase (α) for the top substrate and bottom reflector substrate may also be the same and the total residual phase for the TN-LC cell may be 2α. Next, the film thickness and the polarizer angle may need to be calculated to cancel the total residual phase in order to obtain a dark state, such as for achieving a high contrast ratio. According to the coordinate system shown in FIG. 3, the relationship between the following 5 parameters should be determined: a polarizer angle β in the range of $(\beta_0-20°+n\cdot90°) \leq \beta \leq (\beta_0+20°+n\cdot90°)$, a slow axis angle of the compensation film θ in the range of $0° \leq \theta \leq 180°$, a phase retardation of the compensation film δ in the range of $(\delta_0-0.2\pi) \leq \delta \leq (\delta_0+0.2\pi)$, a twisted angle of TN-LC layer φ, and a half residual phase α.

After some mathematic calculations, in a reflective TN-LC cell with twisted angle φ and total residual phase 2α at high voltage state, the phase retardation of the compensation film $\delta_0$ may be dependent on the slow axis angle of the compensation film θ as follows:

$$\delta_0 = \operatorname{atan}\left(\frac{\sin^2\phi + \cos2\alpha\cos^2\phi}{\sin\alpha\sin2\theta\sin2\phi + \sin2\alpha\cos2\theta\cos^2\phi}\right) \quad (1)$$

From this equation, for each slow axis angle of the compensation film θ, the corresponding phase retardation $\delta_0$ can be determined, wherein θ and $\theta \pm n\cdot180°$ (where n may be an integer) may be equivalent in determining the phase retardation of the compensation film. Additionally, φ and $\phi \pm 180°$ may also be equivalent in determining the phase of the compensation film. Note that 2α may be the total residual phase of TN-LC cell and $\alpha = 2\pi\cdot\psi/\lambda$ may be the phase of each boundary sub-layer at an operating voltage, wherein ψ may be the residual retardation of each boundary sub-layer and λ may be the wavelength of light. In general, ψ may be in a range of about 5 to about 50 nm.

After determining the phase retardation of the compensation film, the relative polarizer angle in reference to the slow axis angle of film, β-θ may be determined. According to the aforementioned two-layer model, n is an integer with $\beta_0$ satisfies the following relation:

$$\beta_0 = \theta + \frac{1}{2}\operatorname{atan}\left(-\frac{\sin^2\phi + \cos2\alpha\cos^2\phi}{\sin\delta_0(\sin\alpha\cos2\theta\sin2\phi - \sin2\alpha\sin2\theta\cos^2\phi)}\right) \quad (2)$$

Similarly, for each slow axis angle θ of the compensation film, the relative polarizer angle β-θ can be determined, provided that the twisted angle φ and the half residual phase α are given. Here the phase retardation δ may be determined from Eq. (1). Note that φ and $\phi \pm 180°$ may be equivalent while determining the relative polarizer angle β-θ. Additionally, θ and $\theta \pm n\cdot180°$ (where n may be an integer) may also be equivalent because the tangent has π periodicity.

FIGS. 5A through 7B illustrate the relationship between the phase retardation δ and the slow axis angle θ of the compensation film for different twisted angles φ under three exemplary conditions: 2ψ=20 nm, 40 nm, and 60 nm. For the special cases that φ=±90°, the compensation film may be a quarter wave film and for a homogeneous cell (φ=0°), the vibration may reach the maximum. For other twisted angles, the phase retardation may deviate from the quarter-wave film. Comparing FIGS. 5A-5C, the variation range increases when the total boundary residual retardation increases from 20 nm to 60 nm.

FIGS. 8A through 10B show the relationship between the relative polarizer angle β-θ and the slow axis angle of compensation film θ for different twisted angle φ when the total boundary residual retardation is 2ψ=20 nm, 40 nm, and 60 nm, respectively. The relative polarizer angle β-θ varies around 45°. When φ=±90°, the relative polarizer angle β-θ may equal about 45° and the incident light may be converted to circularly polarized light because the compensation film is a quarter-wave, as shown in FIGS. 5A-7B. When φ=0°, the oscillation may reach a maximum. Comparing FIGS. 8A-10B, similarly, the variation range increases when the total boundary residual retardation increases from about 20 nm to about 60 nm. For a given liquid material, the total boundary residual retardation 2ψ may decrease with an increase of applied voltage. Generally speaking, the larger the total boundary residual retardation 2ψ, the larger the variation range of δ and β-θ.

Figure 11:
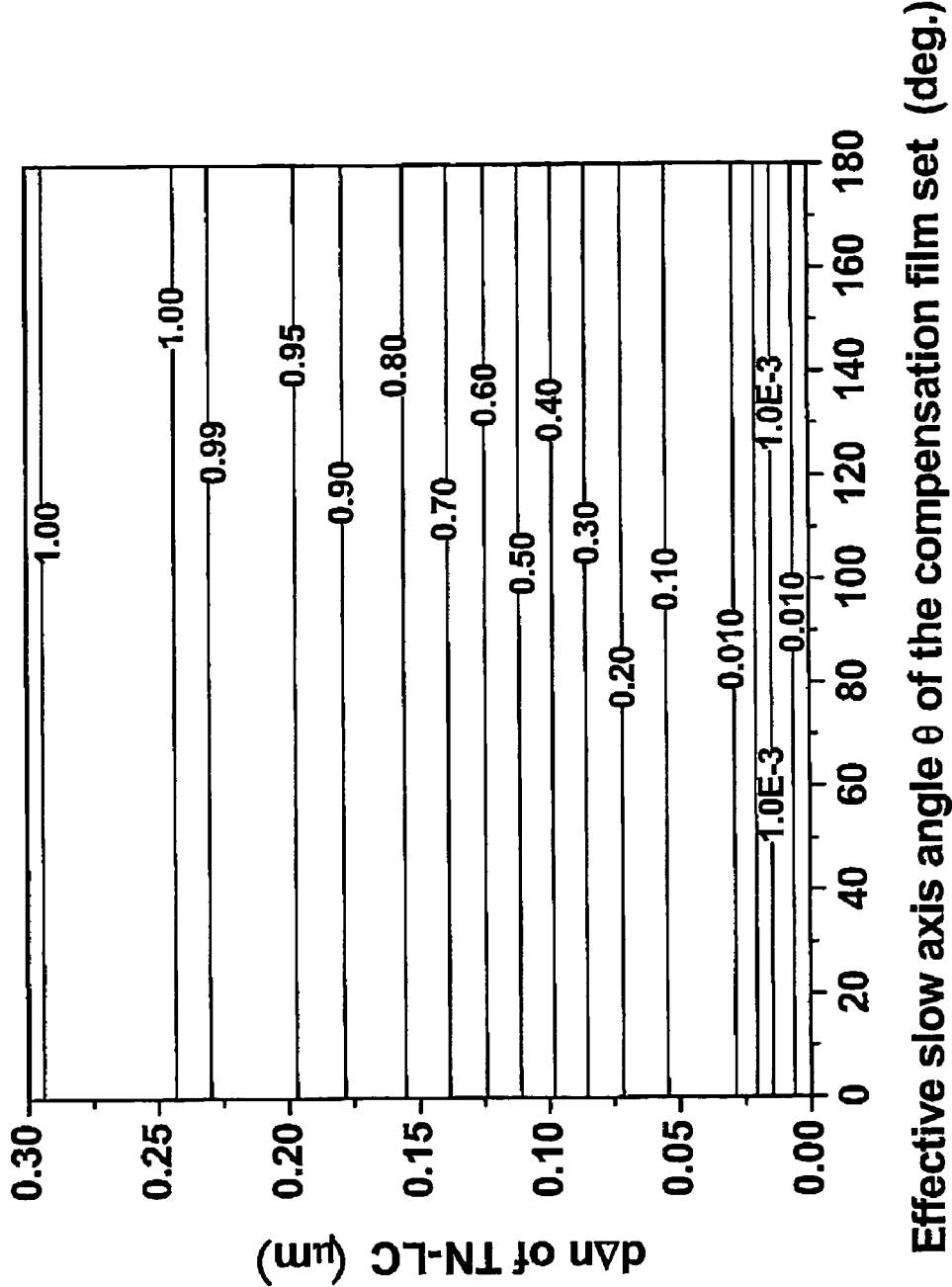
FIG. 11 is a graph illustrating the electro-performance of the film-compensated reflective TN cell, independent of the slow axis angle θ of the compensation film, wherein numbers represent normalized reflectance and lines denote iso-reflectance.

Based on the conditions of the compensation film and the polarizer, the electro-optical (EO) performance may be independent of the slow axis angle of the compensation film θ. For a given cell (i.e., twist angle φ and total boundary residual retardation 2ψ may be given), as long as the phase retardation of the compensation film according to Eq.(1) and the relative polarizer angle according to Eq.(2) are chosen, the EO curve may be identical no matter what slow axis angle is chosen. For example, FIG. 11 shows the iso-reflectance of the 70° GF-RTN-LCD for different slow axis angle θ, wherein 2ψ=40 nm and λ=550 nm are assumed. Therefore, the iso-reflectance line may be independent of θ, which means the EO curve may also be independent of θ.

Figure 12A:
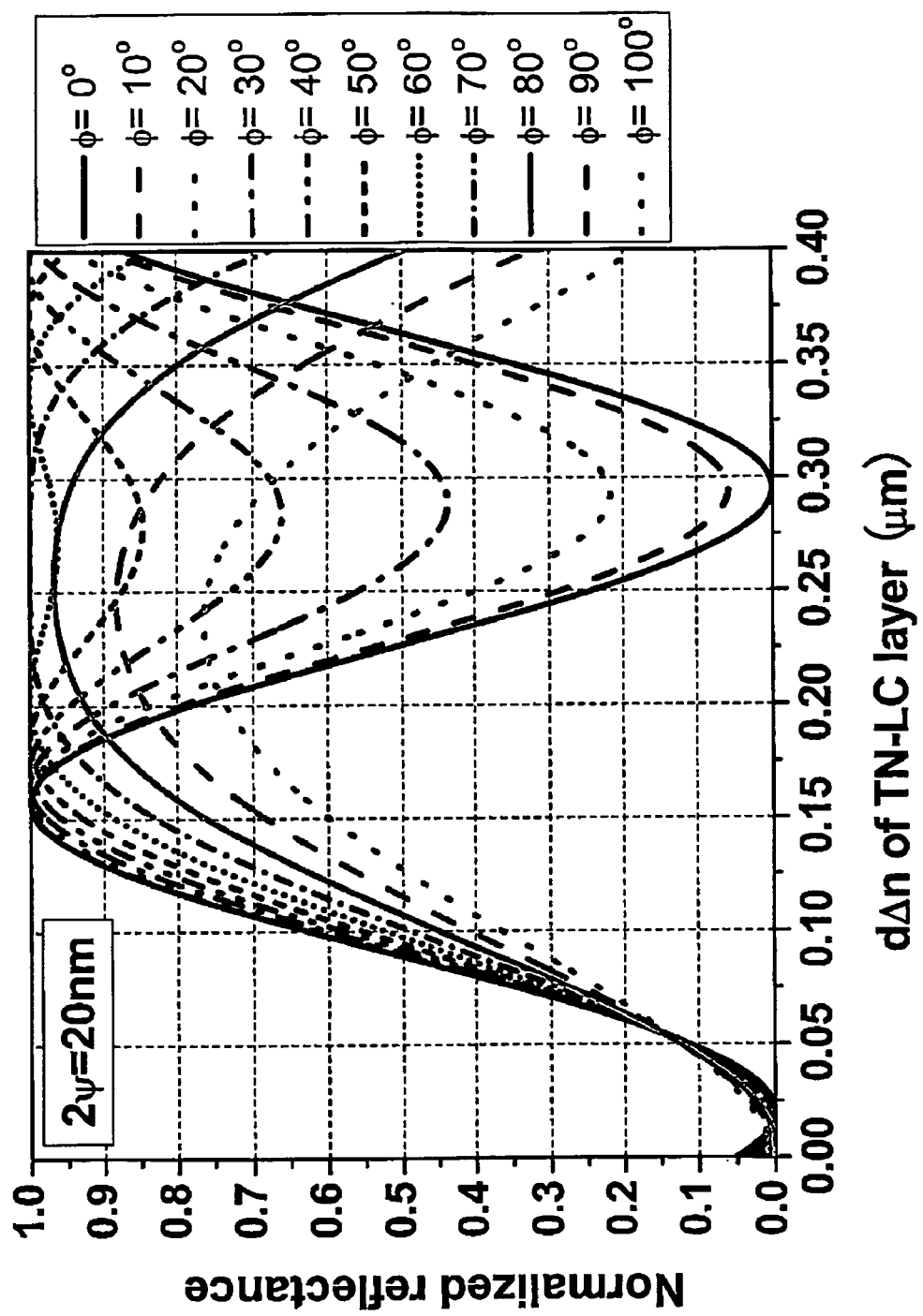
FIGS. 12A-12C show the dΔn dependant reflectance of various TN-LC cells under three residual retardations 2ψ=20 nm, 40 nm, and 60 nm.
Figure 12B:
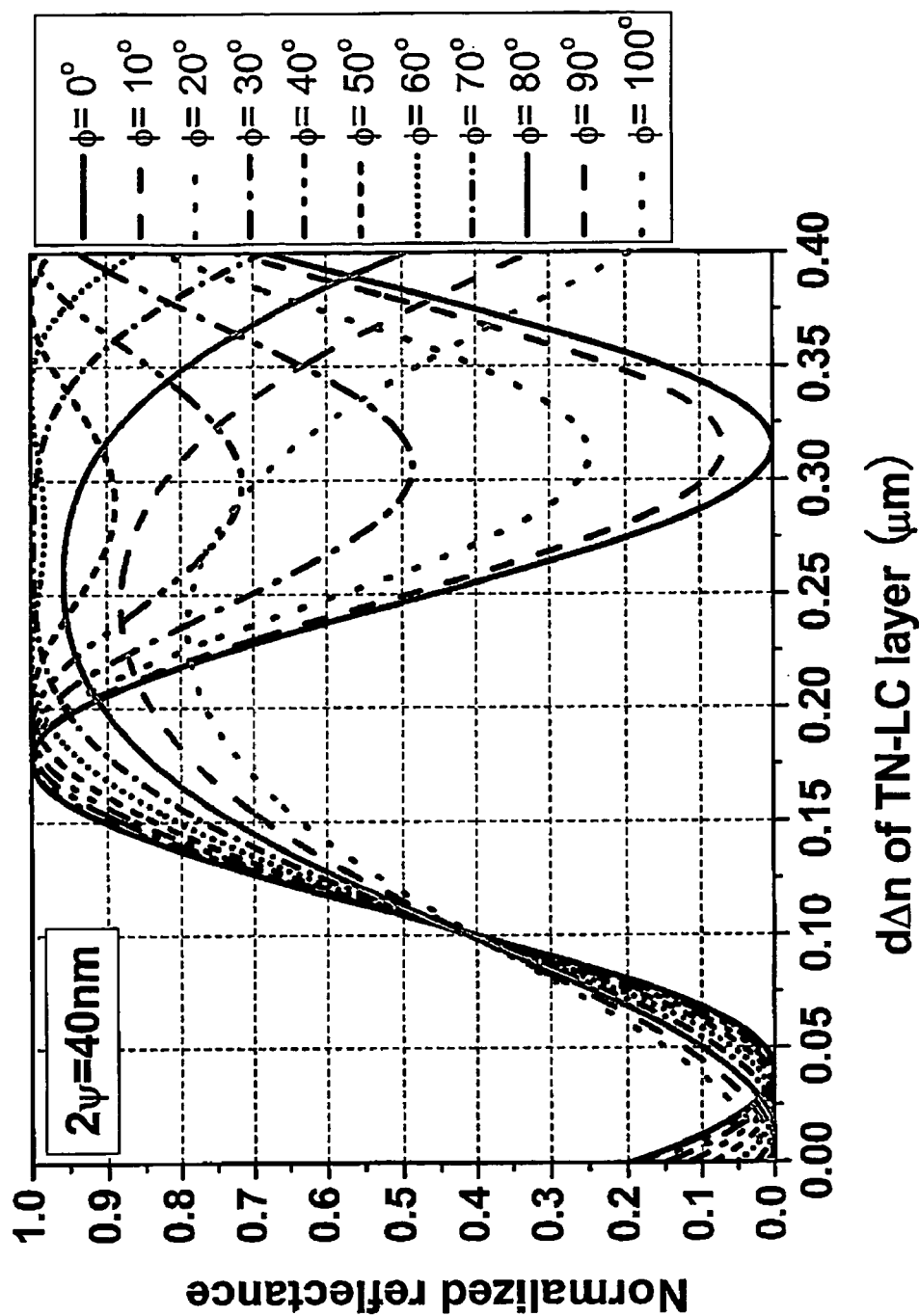
Figure 12C:
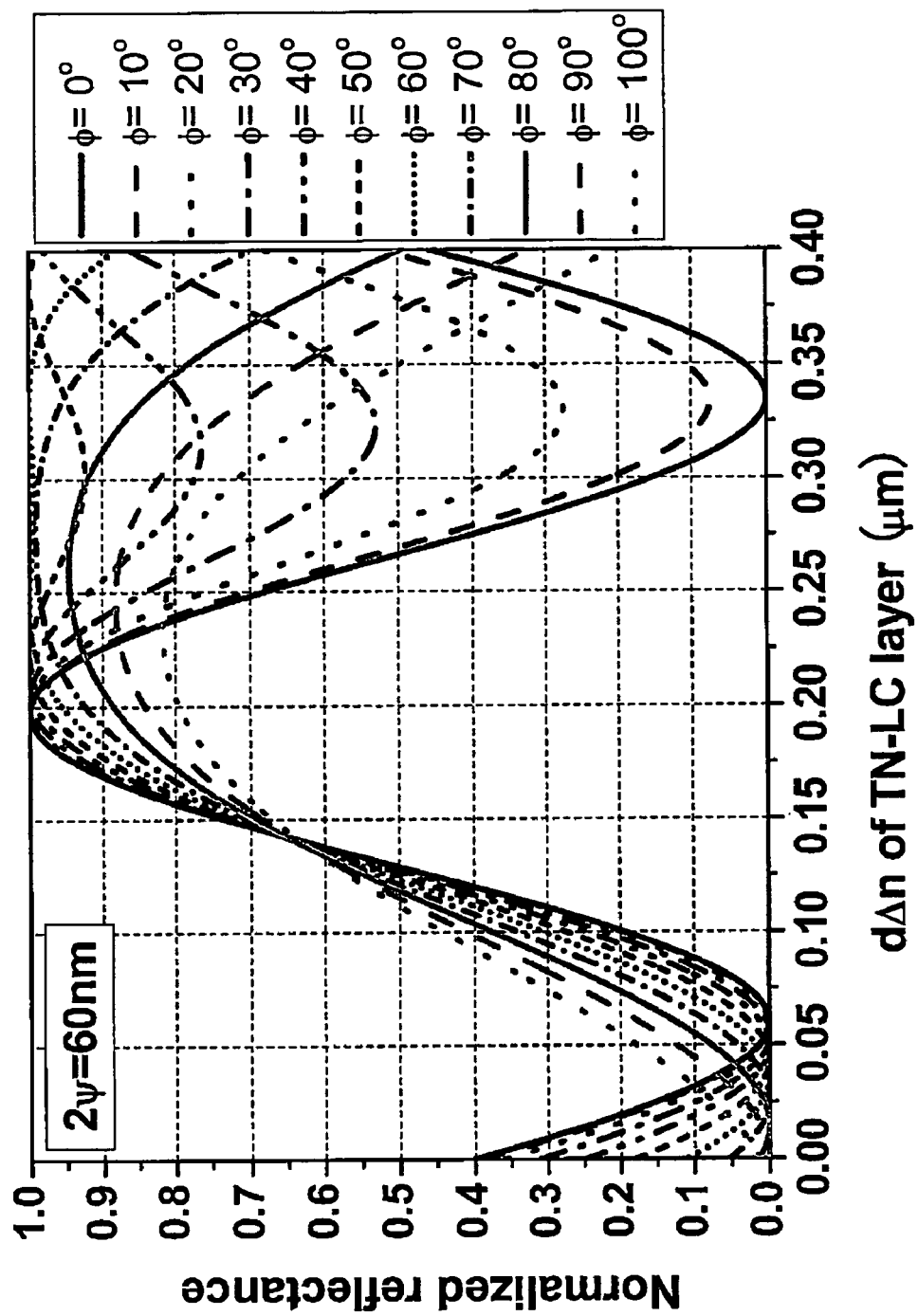
Figure 13A:
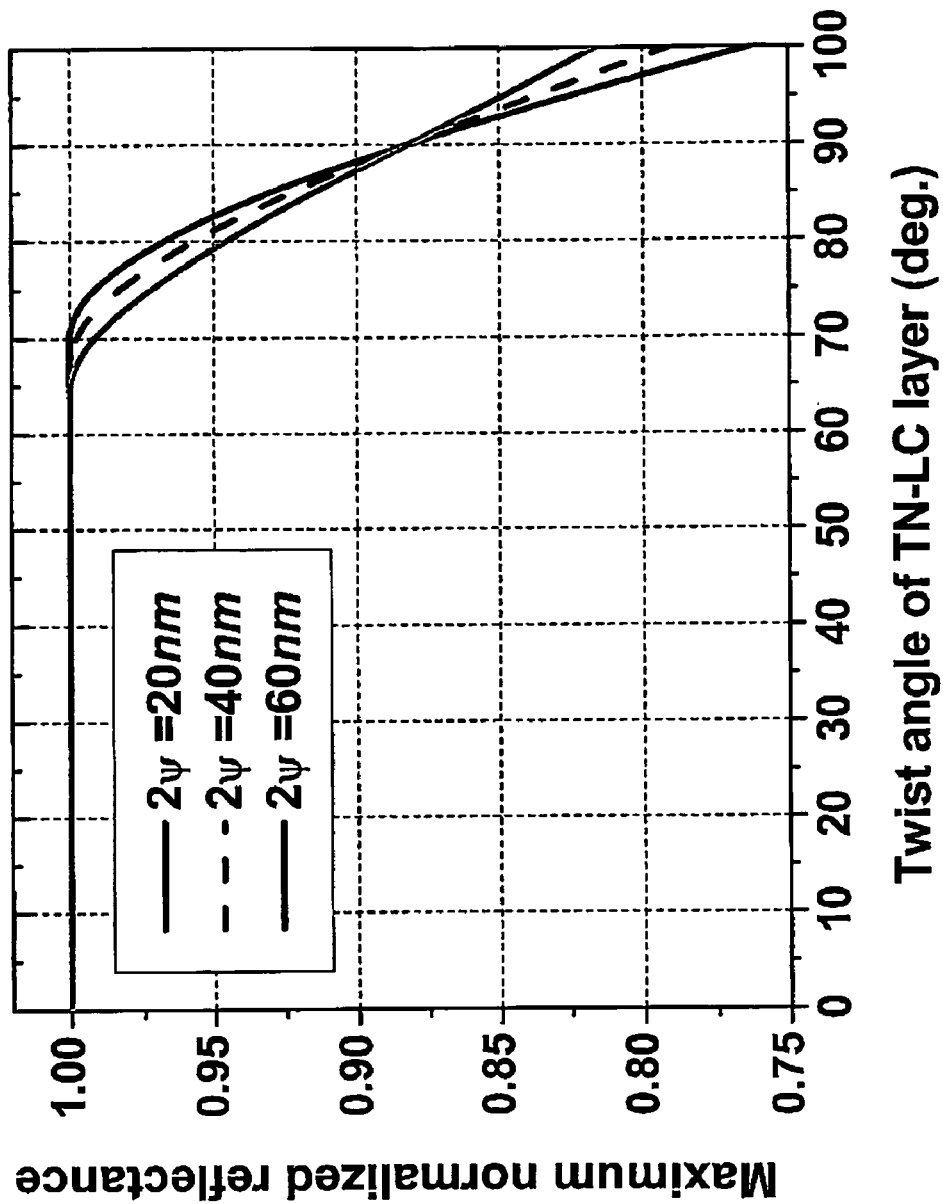
FIGS. 13A-13B show the maximum reflectance as a function of twisted angle under three residual retardations 2ψ=20 nm, 40 nm, and 60 nm.
Figure 13B:
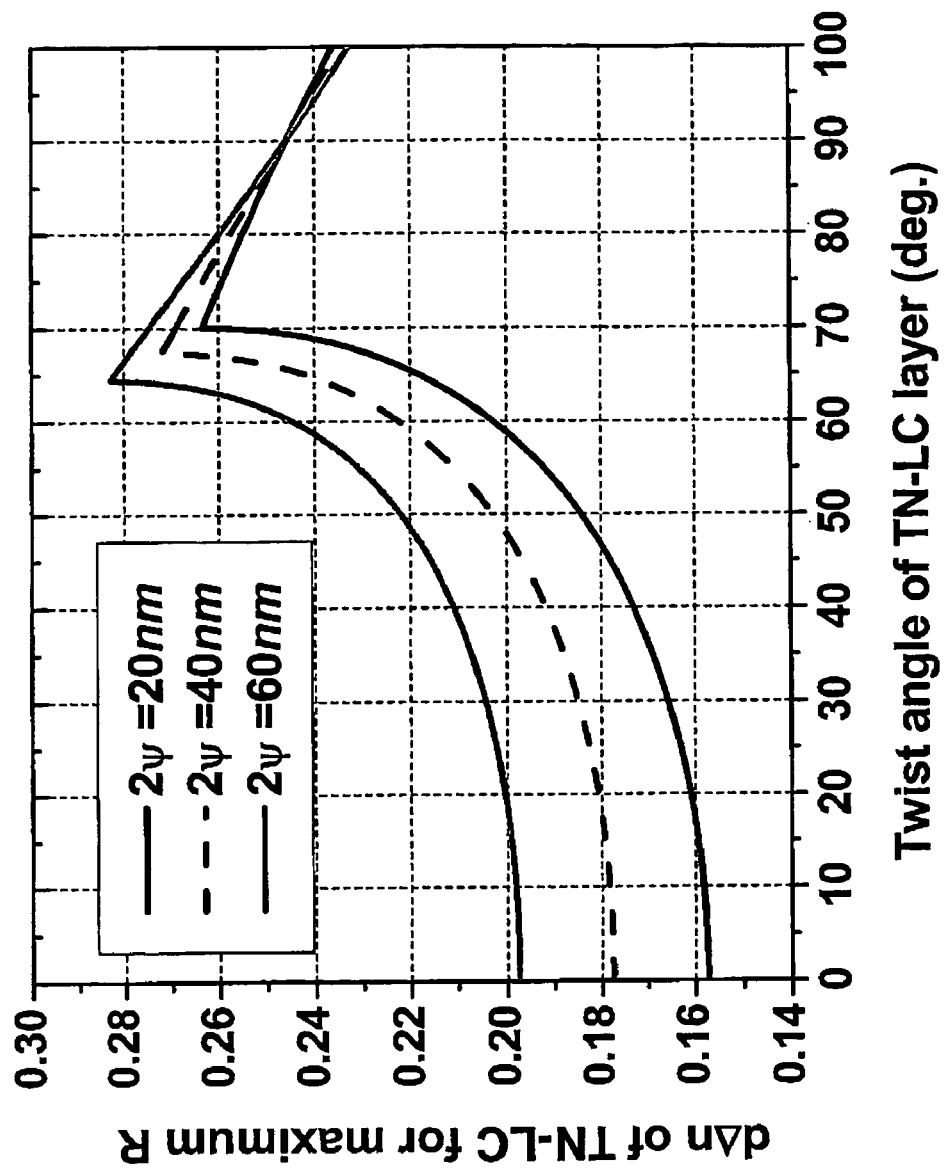

After the parameters of the compensation film and the polarizer are obtained, the thickness of TN-LC layer for each twisted angle needs to be obtained in order to get the high reflectance for the voltage-off state. FIGS. 12A through 12C show the dΔn dependent reflectance of the TN-LC layer at V=0 for three cases of total boundary residual retardation: 2ψ=20 nm, 40 nm, and 60 nm, respectively. In quite a wide range the normalized reflectance may be kept at unity when φ≅60°-70°. That means the color dispersion in this range can be small. FIG. 13A shows the relationship between maximum normalized reflectance and twisted angle for different boundary residual retardations 2ψ=20 nm, 40 nm, and 60 nm. When twisted angle may be larger than approximately 70°, the maximum normalized reflectance may drop from 1. As the total boundary residual retardation 2ψ increases, the maximum twisted angle that corresponds to the maximum reflectance may decrease accordingly. FIG. 13B shows the relationship between the dΔn value of the TN-LC layer corresponding to the maximum reflectance at V=0 and twisted angle for 2ψ=20 nm, 40 nm, and 60 nm.

Based on the conditions of the compensation film, the polarizer and the dΔn value of the TN-LC layer, some exemplary embodiments are disclosed. The simulation parameters are listed in Table 1.

TABLE 1

| Parameters | Values |
|---|---|
| ne($\lambda$ = 450, 550, 650 nm) | (1.559, 1.548, 1.542) |
| no($\lambda$ = 450, 550, 650 nm) | (1.485, 1.476, 1.471) |
| $\Delta$n | (0.074, 0.072, 0.071) |
| K11 | 9.6 × 10-12 N |
| K22 | 6.1 × 10-12 N |
| K33 | 14.2 × 10-12 N |
| $\epsilon$// | 14.3 |
| $\epsilon\perp$ | 4.0 |
| Pretilt angle | 3° |
| Free pitch | 300 μm |

Figure 14A:
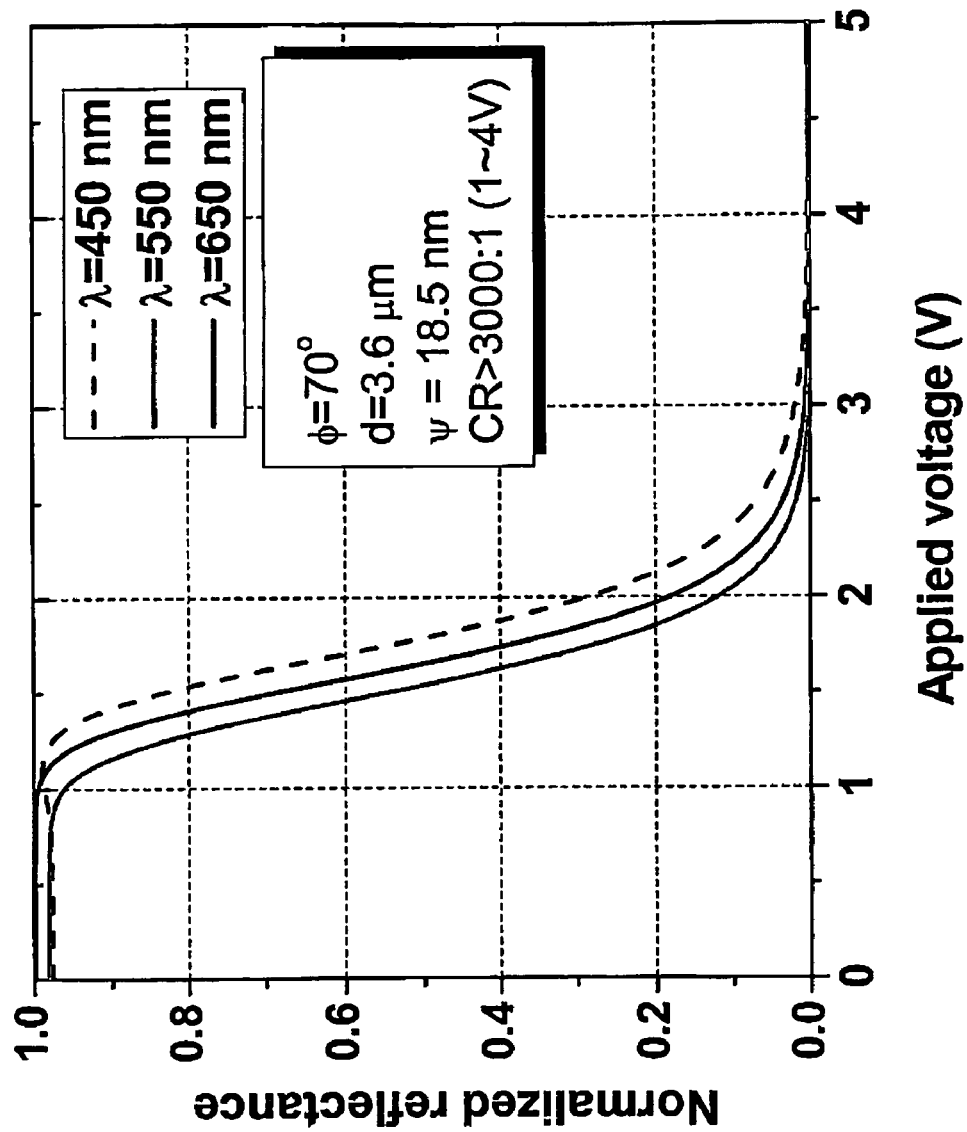
FIG. 14A is a graph illustrating the voltage dependent reflectance of the 70° GF-RTN-LCD with cell gap d=3.6 μm, wherein the compensation film and polarizer are based on 2ψ=37 nm at 4V.
Figure 14B:
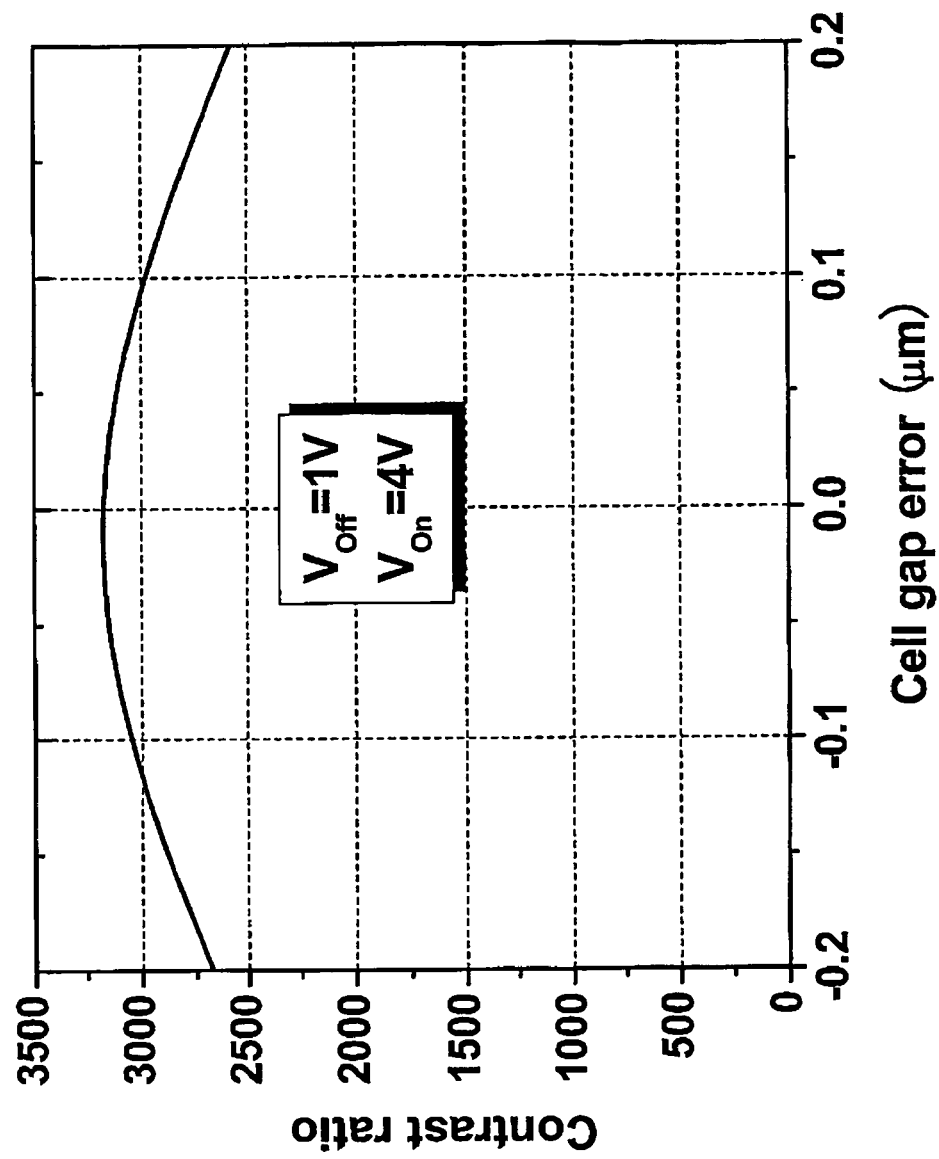
FIG. 14B is a graph illustrating the cell gap tolerance on the device contrast ratio of the 70° GF-RTN-LCD with cell gap d=3.6 μm, wherein the compensation film and polarizer are based on 2ψ=37 nm at 4V.
Figure 15A:
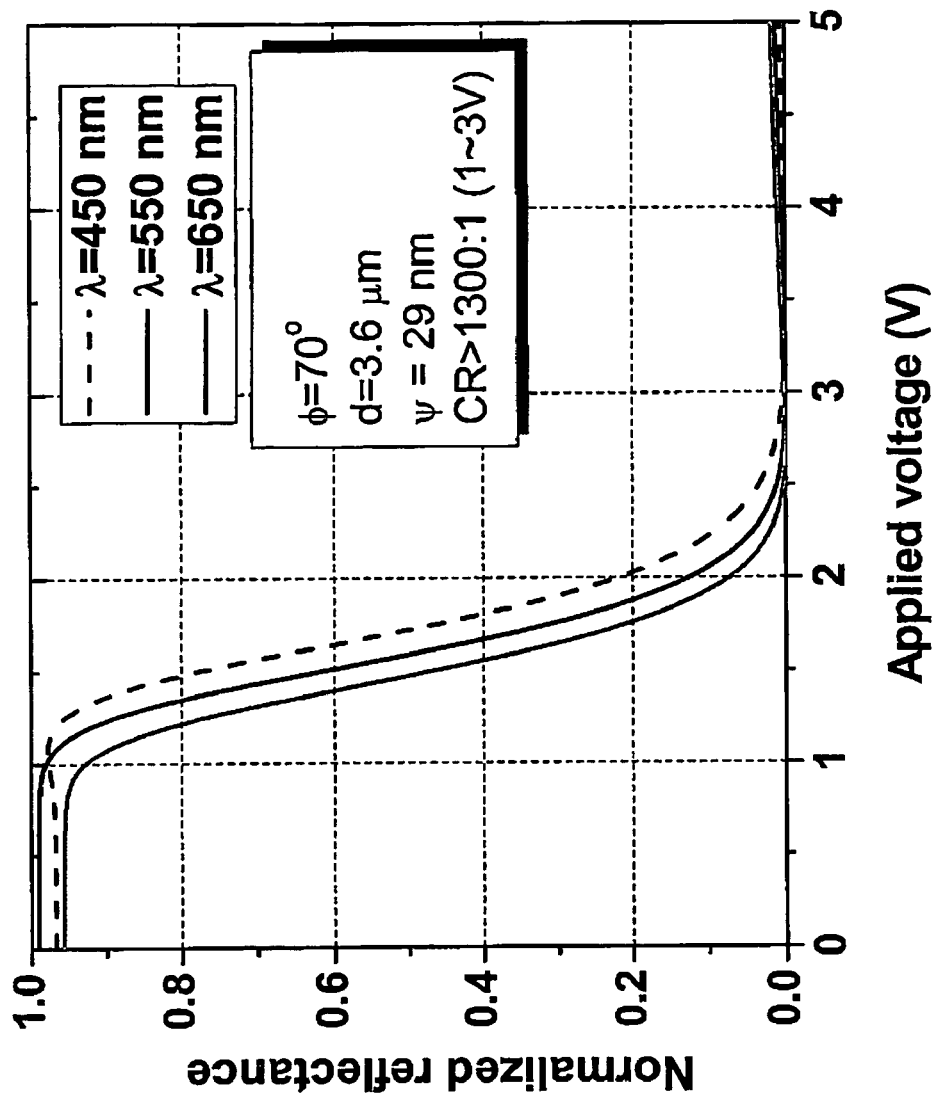
FIG. 15A is a graph illustrating the voltage dependent reflectance of the 70° GF-RTN-LCD with cell gap d=3.6 μm, wherein the compensation film and polarizer are based on 2ψ=58 nm at 3V.
Figure 15B:
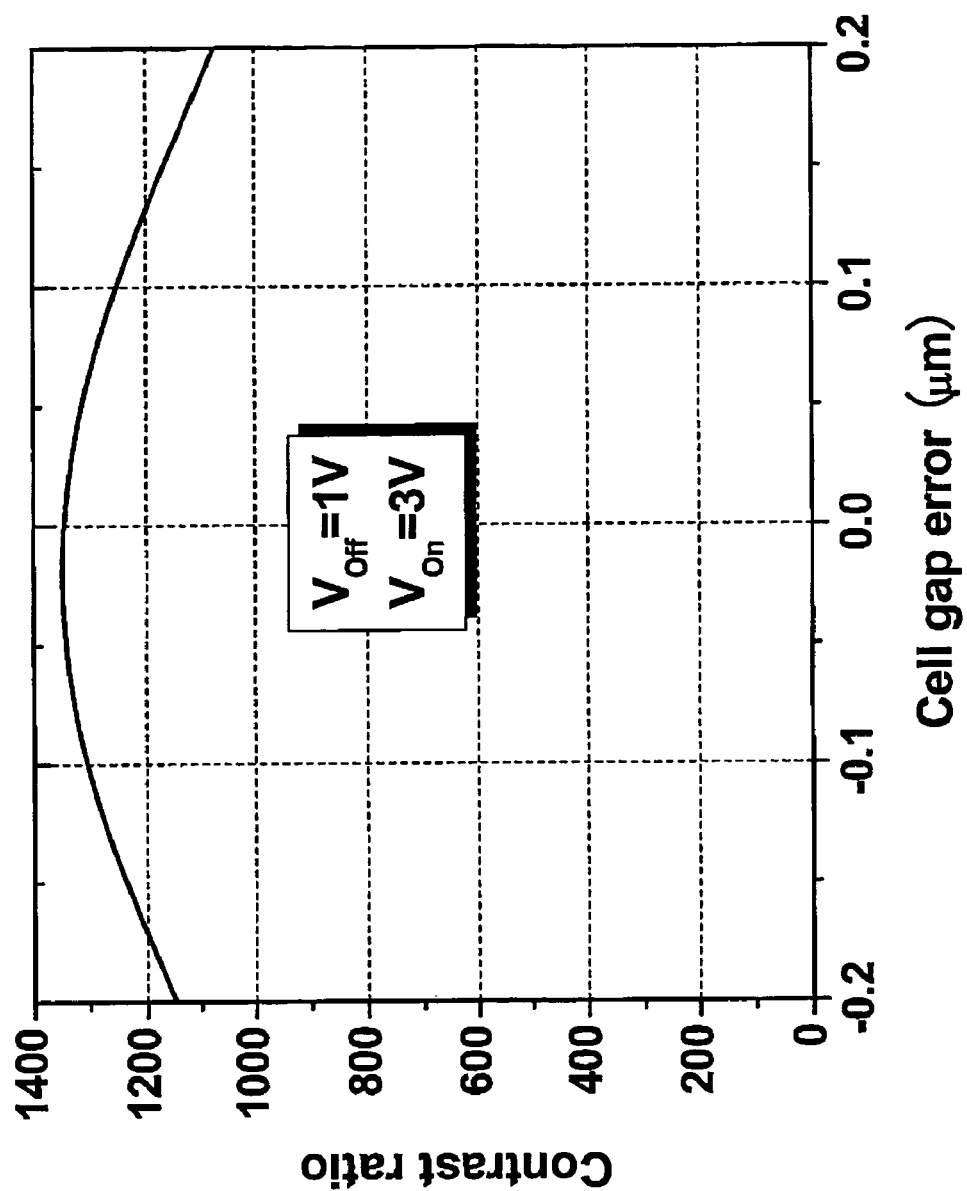
FIGS. 15B is a graph illustrating the cell gap tolerance on the device contrast ratio of the 70° GF-RTN-LCD with cell gap d=3.6 μm, wherein the compensation film and polarizer are based on 2ψ=58 nm at 3V.

In an embodiment, FIGS. 12A-12C show the d$\Delta$n dependant reflectance of various TN-LC cells under three residual retardations 2$\psi$=20 nm, 40 nm, and 60 nm. A 70° GF-RTN-LCD was provided. In FIGS. 12A-12C, the maximum reflectance occurred at d$\Delta$n≅0.26 μm. The cell gap was 3.6 μm for the LC material employed. It was assumed that the desired dark state was at 4V. The total residual retardation 2$\psi$ at this driving voltage was first calculated and the result was 2$\psi$=37 nm. Based on this total residual retardation, the phase retardation of the compensation film and the the relative polarizer were obtained from Eqs.(1) and (2), respectively. Because the EO performance was independent from the slow axis angle θ, an θ angle was chosen in determining δ and β-θ as expressed in Eqs.(1) and (2). Based on the compensation film and the polarizer conditions, the EO performances were obtained, as shown in FIG. 14A. The color dispersion at V=0 was small. FIG. 14B shows a graph illustrating the cell gap tolerance on the device contrast ratio of the 70° GF-RTN-LCD with cell gap d=3.6 μm, wherein the compensation film and the polarizer were based on 2$\psi$=37 nm at 4V. Even if the cell gap had ±0.2 μm uncertainty, the contrast ratio was greater than 2500:1. Because the driving voltage was further decreased to 3V for the interest of low power consumption, the total residual phase at this driving voltage needs to be recalculated. The compensation film and the polarizer conditions also needed to be recalculated. After calculation, 2$\psi$=58 nm and the corresponding EO performances were obtained and shown in FIG. 15A. Because the driving voltage was decreased, the total residual retardation increased accordingly, resulting in a slight bounce in the EO curve after reaching the dark state. Nevertheless, the contrast ratio was greater than 1300:1. FIG. 15B shows a graph illustrating the cell gap tolerance on the device contrast ratio of the 70° GF-RTN-LCD with cell gap d=3.6 μm, wherein the compensation film and polarizer were based on 2$\psi$=58 nm at 3V. A high contrast ratio of greater than 1000:1 was achieved even though the cell gap error was ±0.2 μm.

To extend this method to transflective LCD, a broadband circular polarizer below the transflector needed to be assessed. In the voltage-on state, the compensation film and total boundary residual retardation of the TN-LCD layer together functioned as a circular polarizer. Therefore, after passing through the broadband circular polarizer and the transflector, the backlight was blocked by the equivalent circular polarizer, resulting in a good dark state.

Figure 16:
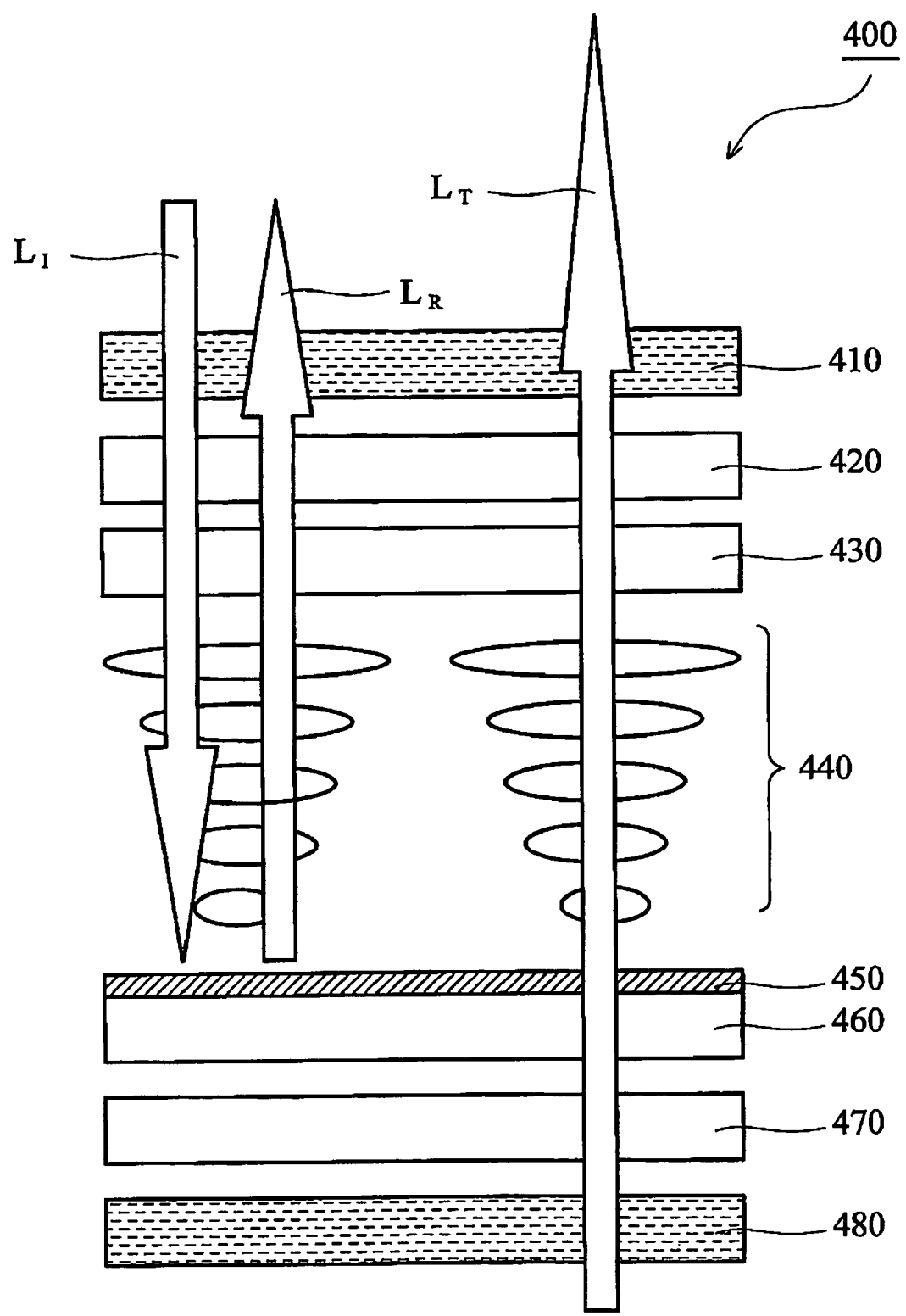
FIG. 16 shows the structure of a general film compensated transflective twisted nematic liquid crystal display (GF-TRTN-LCD) according to various disclosed embodiments.

FIG. 16 shows a schematic diagram of the structure of a general film compensated transflective twisted nematic liquid crystal display (GF-TRTN-LCD) 400. GF-TRTN-LCD 400 comprises a polarizer 410, a compensation film 420, a liquid crystal cell comprising a first substrate 460 and a second substrate 430, and a TN-LC layer 440 interposed therebetween. The first substrate 460 may have a reflector 450. In reflective mode, incident light $L_I$ passes through the liquid crystal cell, and is reflected by reflector as reflective light $L_R$. Alternatively, the first substrate 4300 can be a transflector. In transmissive mode, incident light $L_T$ can pass through the liquid crystal cell directly.

Figure 17:
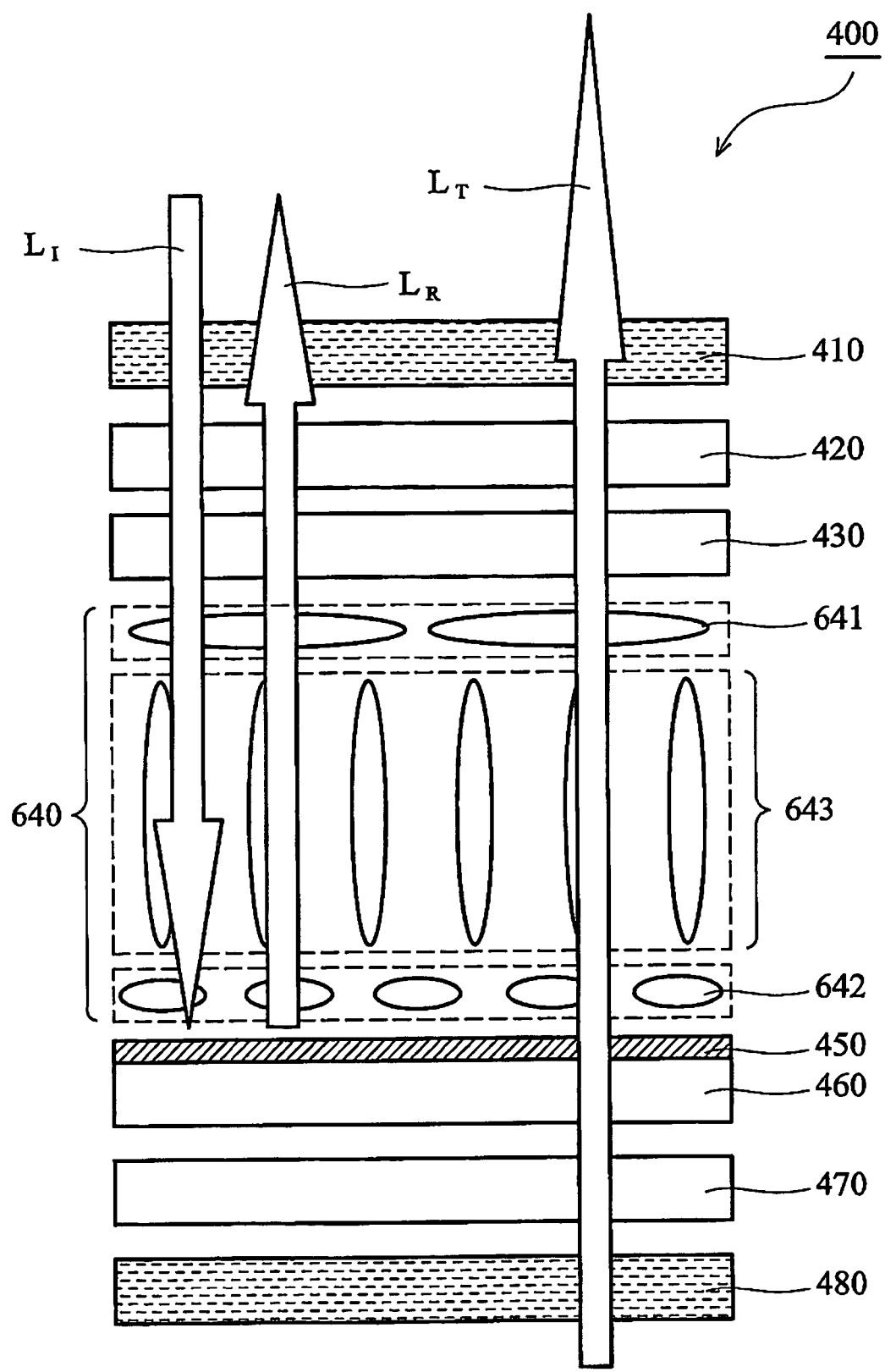
FIG. 17 is a schematic diagram showing a two-sublayer model of the GF-TRTN-LCD at high voltage state.

In a TN-LC cell with twisted angle of $\phi$ and positive dielectric anisotropic liquid crystal materials, when sufficient voltage is applied to the cell, the middle layers of the liquid crystal cell may be aligned along an electric field direction. However, the boundary layers of the liquid crystal cell may suffer little disturbance because of strong surface anchoring. Thus, two, thin boundary layers 641, 642 may be formed in a high voltage state, as shown in FIG. 17. One sub-layer 642 may be located near a second substrate 430 and another sub-layer 641 may be near the first substrate 460 (reflector). These boundary layers 130a can be treated as two uniaxial layers with twisted angle $\phi$, as a two-layer model. For a given LC material, the residual retardation of each sub-layer may be inversely proportional to the driving voltage.

Figure 18:
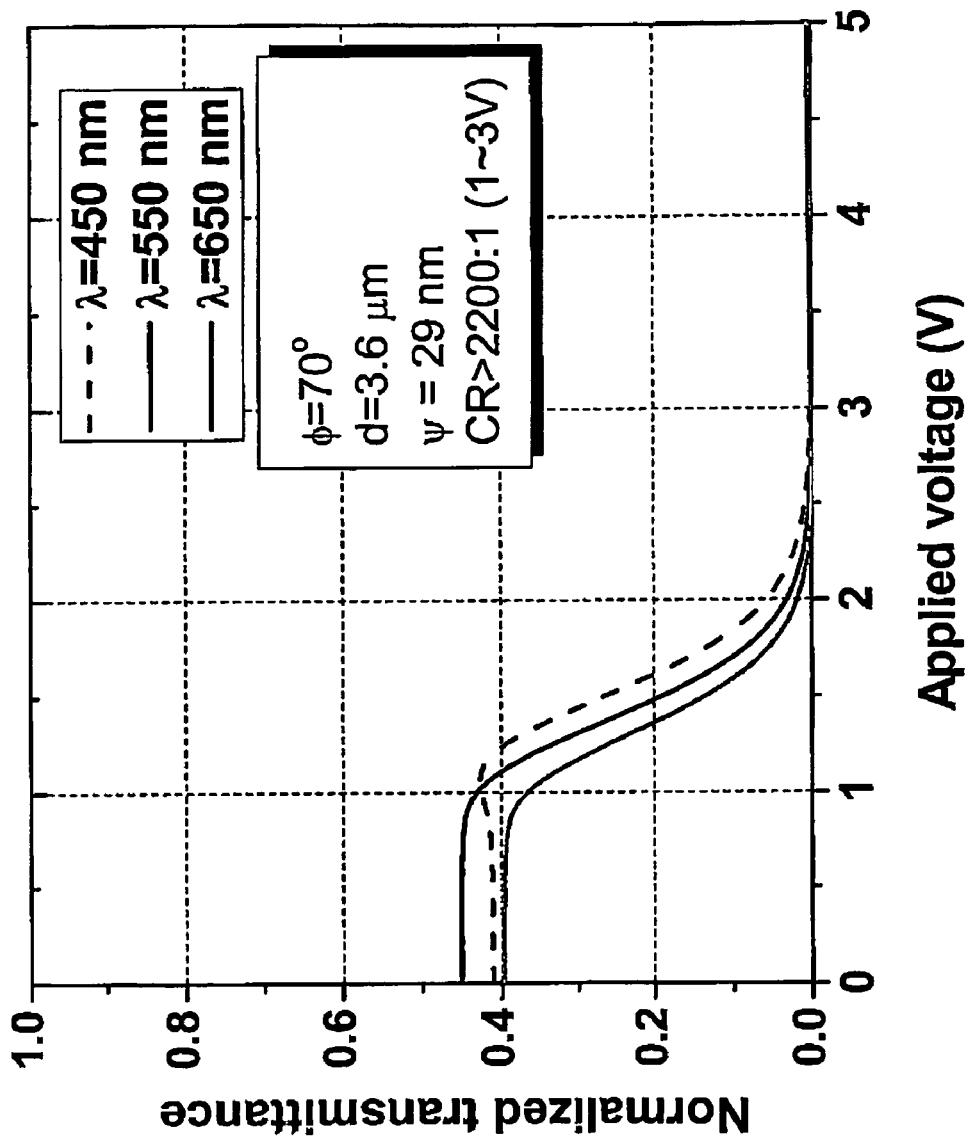
FIG. 18 is a graph illustrating the voltage dependent transmittance of the 70° GF-TRTN-LCD with cell gap d=3.6 μm, wherein the compensation film and polarizer are based on 2ψ=58 nm at 3V.

FIG. 18 shows a graph illustrating the voltage dependent transmittance of the 70° GF-TRTN-LCD with cell gap d=3.6 μm, wherein the compensation film and polarizer were based on 2$\psi$=58 nm at 3V. The contrast ratio exceeded 2200:1.

Figure 19A:
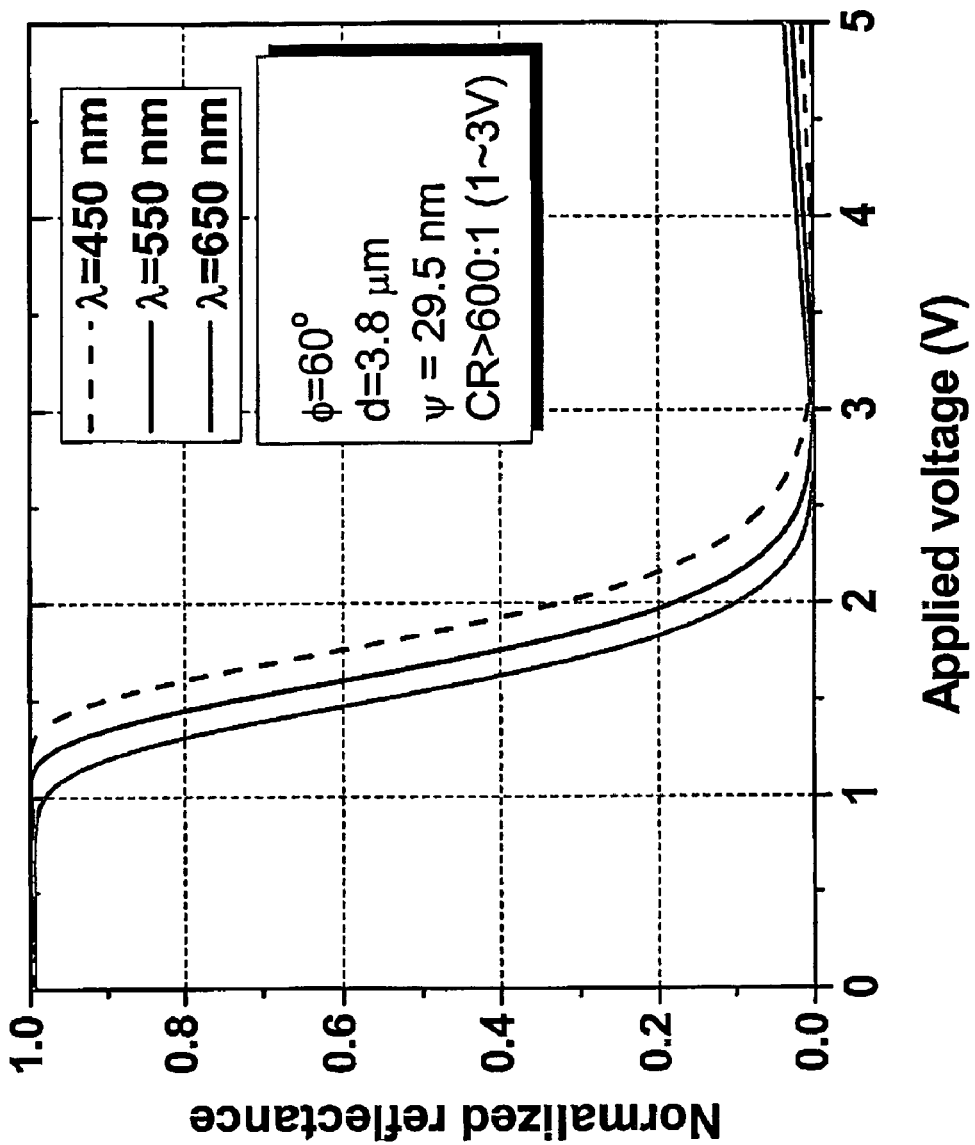
FIG. 19A is a graph illustrating the voltage dependent reflectance of the 60° GF-TRTN-LCD with cell gap d=3.8 μm, wherein the compensation film and polarizer are based on 2ψ=59 nm at 3V.
Figure 19B:
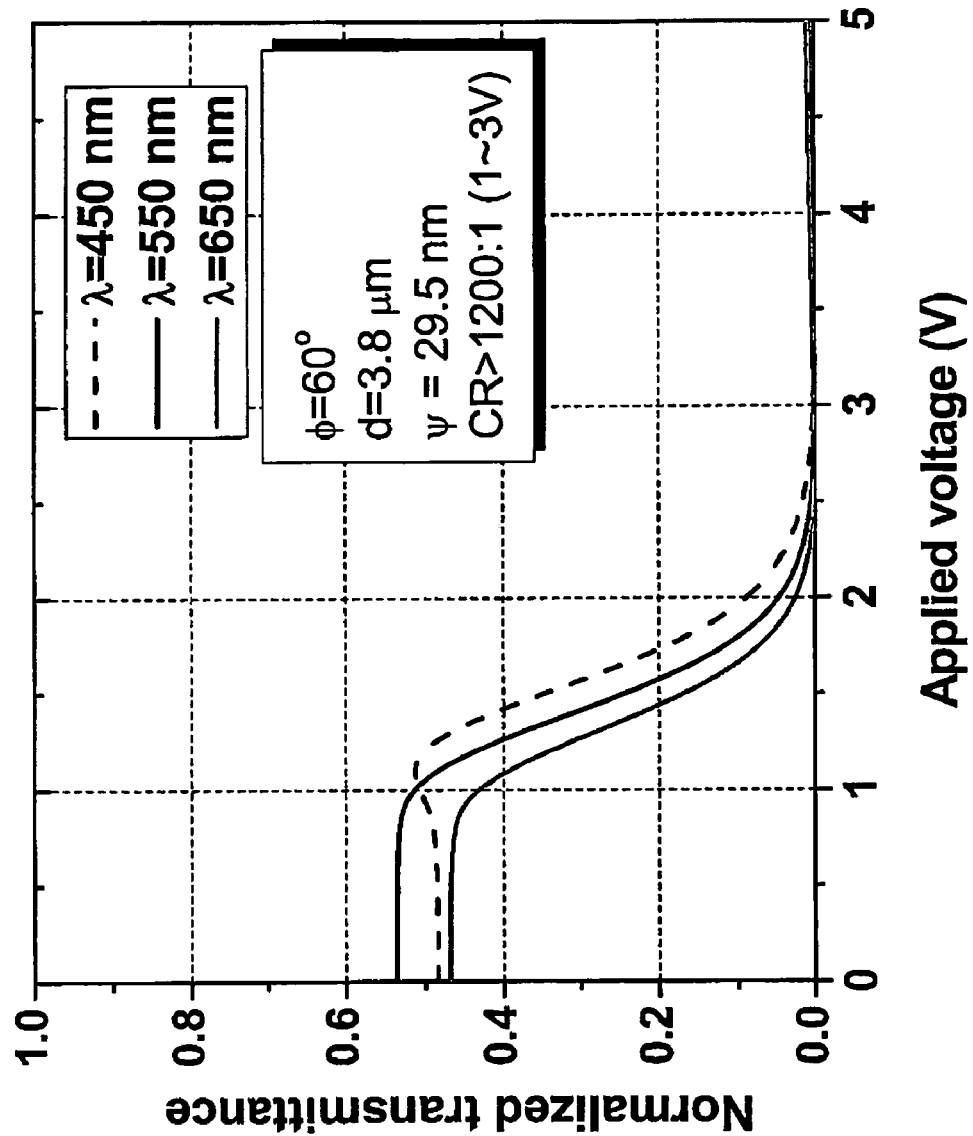
FIG. 19B is a graph illustrating the voltage dependent transmittance of the 60° GF-TRTN-LCD with cell gap d=3.8 μm, wherein the compensation film and polarizer are based on 2ψ=59 nm at 3V.
Figure 19C:
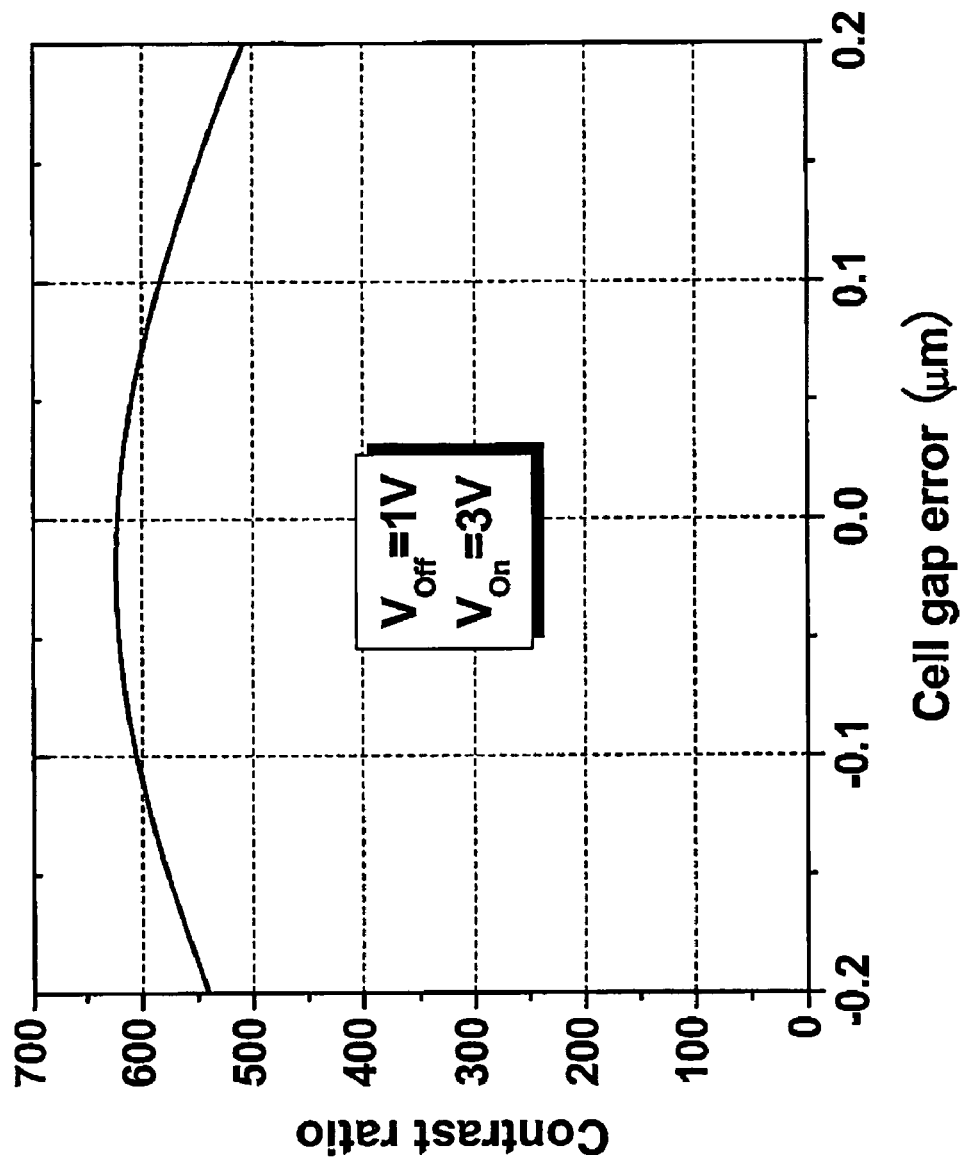
FIG. 19C is a graph illustrating the cell gap tolerance on the device contrast ratio of the 60° GF-TRTN-LCD with cell gap d=3.8 μm, wherein the compensation film and polarizer are based on 2 ψ=59 nm at 3V.

FIGS. 19A through 19B show another embodiment of the 60° GF-TRTN-LCD with cell gap d=3.8 μm. When the driving voltage was 3V, the total boundary residual retardation is 2$\psi$=59 nm. In this embodiment, the contrast ratio exceeded 600:1 and 1200:1 for the reflective and transmissive mode, respectively, as shown in FIGS. 19A and 19B. The cell gap tolerance was also good. Even though the cell gap had ±0.2 μm variation, the reflective mode was still higher than the 500:1 contrast ratio as shown in FIG. 19C.

Figure 20A:
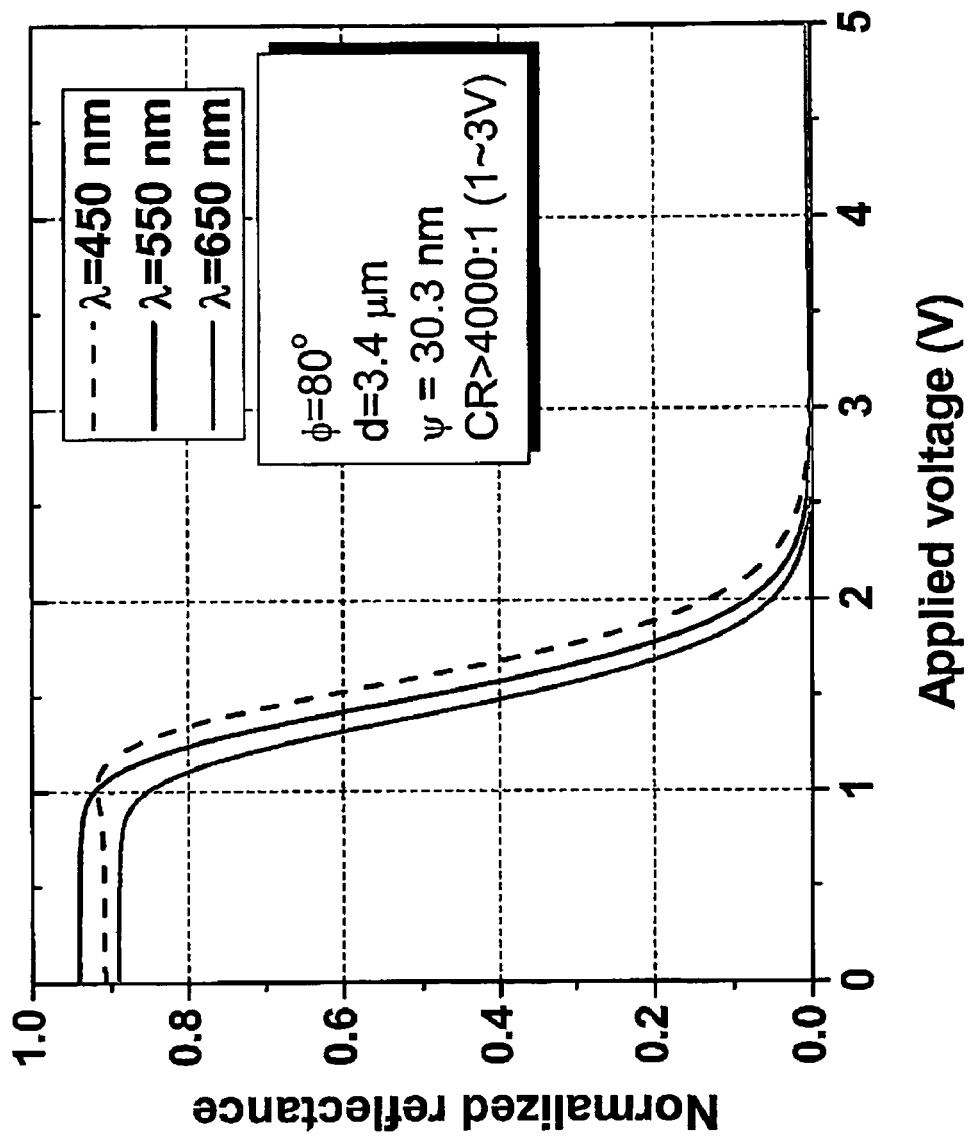
FIG. 20A is a graph illustrating the voltage dependent reflectance of the 80° GF-TRTN-LCD with cell gap d=3.4 μm, wherein the compensation film and polarizer are based on 2ψ=61 nm at 3V.
Figure 20B:
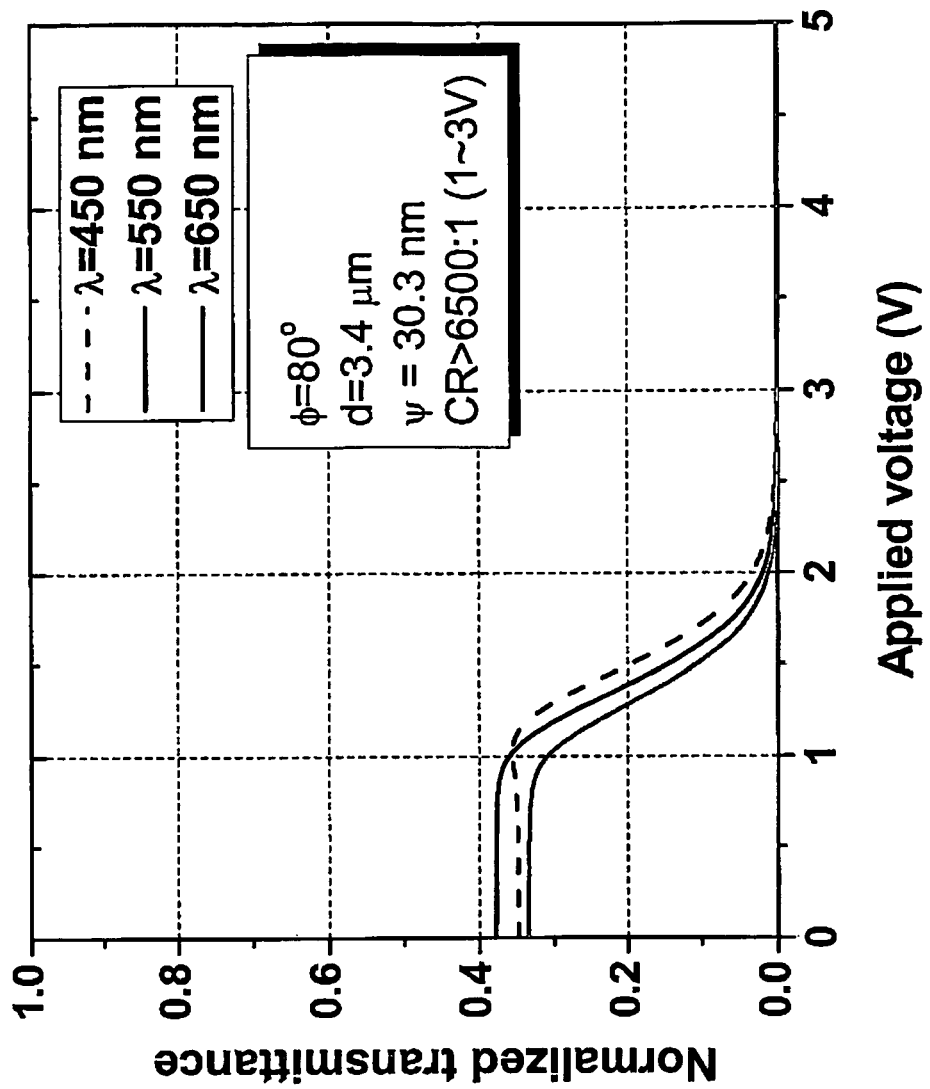
FIG. 20B is a graph illustrating the voltage dependent transmittance of the 80° GF-TRTN-LCD with cell gap d=3.4 μm, wherein the compensation film and polarizer are based on 2ψ=61 nm at 3V.
Figure 20C:
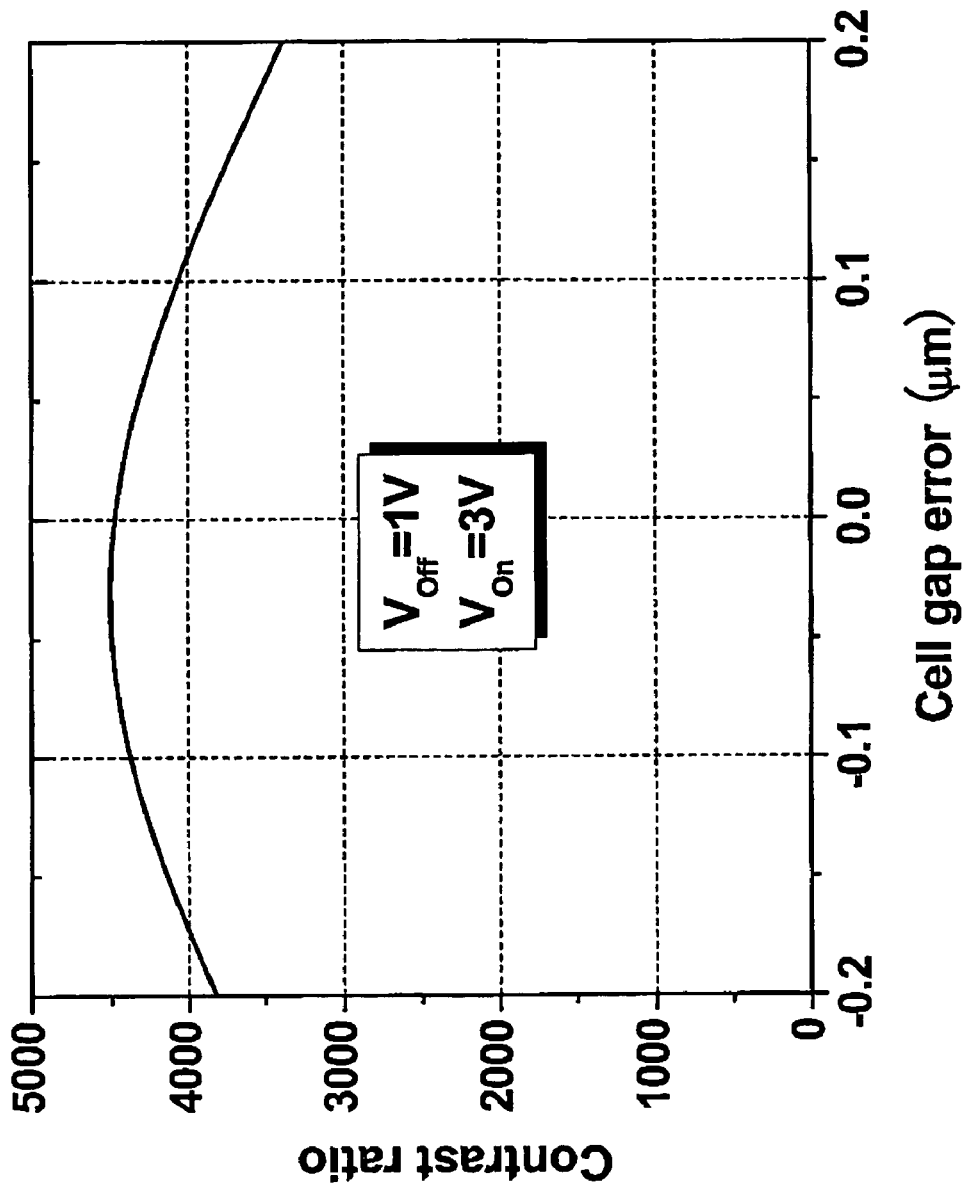
FIG. 20C is a graph illustrating the cell gap tolerance on the device contrast ratio of the 80° GF-TRTN-LCD with cell gap d=3.4 μm, wherein the compensation film and polarizer are based on 2ψ=61 nm at 3V.

FIGS. 20A through 20B show another embodiment of the 80° GF-TRTN-LCD with a cell gap d=3.4 μm. For a 3V driving voltage, the total boundary residual retardation was 2$\psi$=60.6 nm. In this embodiment, the reflective mode contrast ratio was higher than 600:1 and the transflective mode was higher than 6500:1, as shown in FIGS. 20A and 20B. The cell gap tolerance was also good. Even though the cell gap had ±0.2 μm variation, the reflective mode was higher than 3000:1 contrast ratio as shown in FIGS. 20C.

Generally, the twisted angle was chosen in a range of approximately from 0° to 100° so long as the compensation film and the polarizer conditions were properly selected according to Eqs. (1) and (2). Because Eqs. (1) and (2) are deduced from a simplified two-layer model, the optimal film and polarizer conditions deviated slightly from these two equations. At least one advantage of the invention may be the use of a single broadband compensation film to compensate the boundary residual retardation and to obtain a high contrast reflective or reflective LCD.

Figure 21:
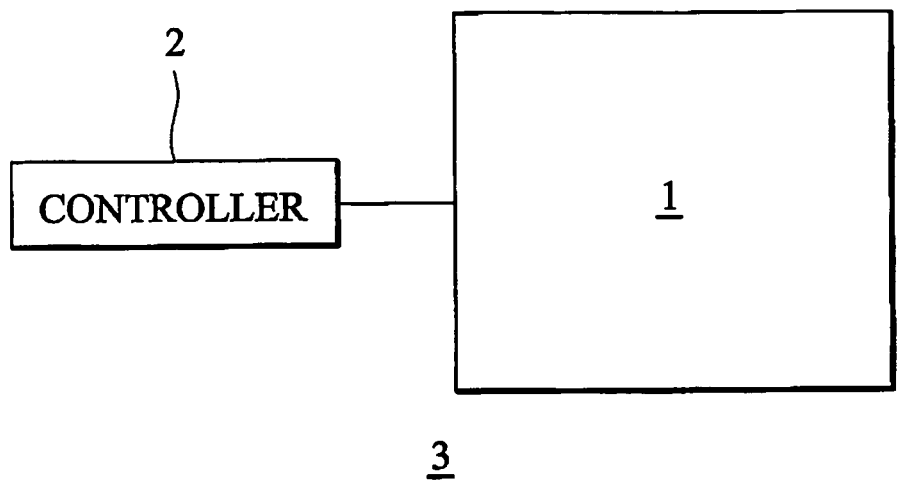
FIG. 21 is a schematic diagram of a display device comprising the GF-RTN-LCD or GF-TRTN-LCD according to various disclosed embodiments.

FIG. 21 is a schematic diagram of a display device 3 comprising the GF-RTN-LCD 1 or GF-TRTN-LCD 1 according to various disclosed embodiments of the invention. A display panel 1 can be coupled to a controller 2, forming a display device 3 as shown in FIG. 21. The controller 3 can comprise a source and gate driving circuits (not shown) to control the display panel 1 to render image in accordance with an input.

Figure 22:
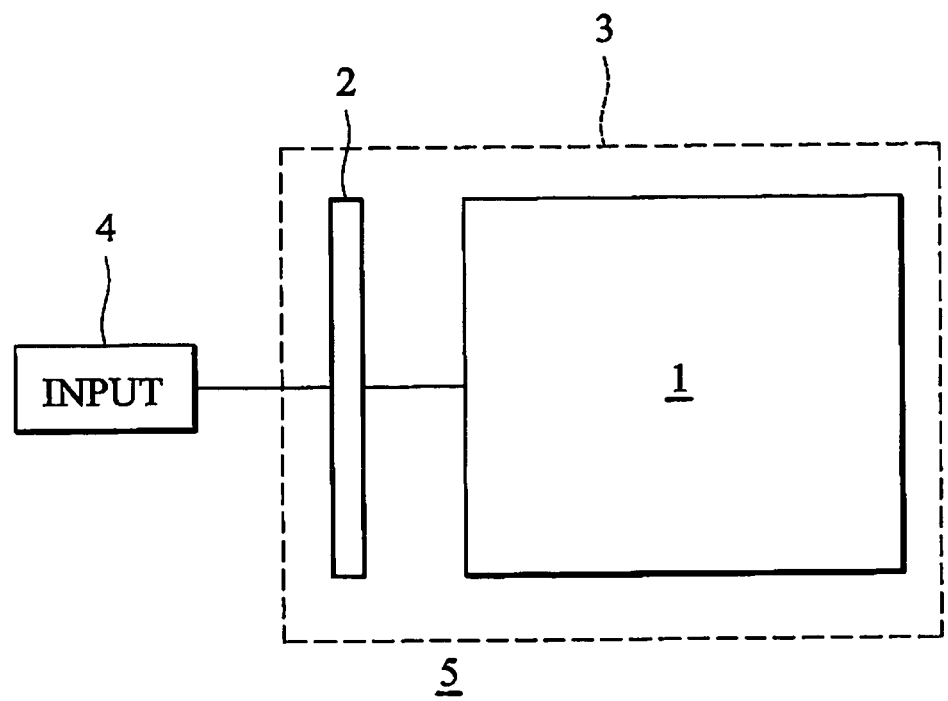
FIG. 22 is a schematic diagram of an electronic device comprising the display device according to various disclosed embodiments.

FIG. 22 is a schematic diagram of an electronic device 5 comprising the display device 3 according to various disclosed embodiments of the invention An input device 4 may be coupled to the controller 2 of the display device 3. The display device 3 can include a processor or the like to input data to the controller 2 to render an image. The electronic device 5 may be a portable device such as a PDA, notebook computer, tablet computer, cellular phone, or a desktop computer.

While the invention has been described by way of example and in terms of the disclosed embodiments, it is to be understood that the invention is not limited to those embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal display, comprising:
   a liquid crystal cell comprising a first substrate, a second substrate, and a liquid crystal layer interposed therebetween, and the liquid crystal cell having a twisted angle $\phi$ and a half residual phase $\alpha$ depending on an external electric field, wherein the liquid crystal layer comprises a middle layer, a first boundary layer sandwiched between the middle layer and the first substrate, and a second boundary layer sandwiched between the middle layer and the second substrate;
   a compensation film disposed on the liquid crystal cell, and having a phase retardation $\delta$ in the range of $(\delta_0-0.2\pi) \leq \delta \leq (\delta_0+0.2\pi)$ and a slow axis angle $\theta$ in the range of $0° \leq \theta \leq 180°$; and
   a polarizer disposed on the compensation film and on an ambient light entrance side and having a polarizer angle $\beta$ in the range of $(\beta_0-20°+n\cdot 90°) \leq \beta \leq (\beta_0+20°+n\cdot 90°)$;
   wherein the compensation film is sandwiched between the polarizer and the liquid crystal cell,
   wherein the phase retardation $\delta_0$ satisfies the following relation:

$$\delta_0 = \mathrm{atan}\left(\frac{\sin^2\phi + \cos 2\alpha \cos^2\phi}{\sin\alpha \sin 2\theta \sin 2\phi + \sin 2\alpha \cos 2\theta \cos^2\phi}\right), \text{ and}$$

wherein n is an integer with $\beta_0$ satisfies the following relation:

$$\beta_0 = \theta + \frac{1}{2}\mathrm{atan}\left(-\frac{\sin^2\phi + \cos 2\alpha \cos^2\phi}{\sin\delta_0(\sin\alpha \cos 2\theta \sin 2\phi - \sin 2\alpha \sin 2\theta \cos^2\phi)}\right).$$

2. The liquid crystal display of claim 1, wherein the liquid crystal cell further comprises a first substrate and an opposing reflective substrate, between which the liquid crystal layer is interposed.

3. The liquid crystal display of claim 2, wherein the opposing reflective substrate comprises a transflective substrate.

4. The liquid crystal display of claim 3, further comprising a broadband circular polarizer disposed beneath the transflective substrate.

5. The liquid crystal display of claim 1, wherein a total residual phase of the liquid crystal cell satisfies the following relation $\alpha = 2\pi \cdot \psi/\lambda$; wherein $\psi$ is a residual retardation of each boundary sub-layer and $\lambda$ is a wavelength of light.

6. A display device, comprising:
   a display panel comprising the liquid crystal display of claim 1; and
   a controller coupled to the display panel to control the display panel to render an image in accordance with an input.

7. A liquid crystal display, comprising:
   a liquid crystal cell comprising a first substrate, an opposing reflective substrate, and a liquid crystal layer interposed therebetween, the liquid crystal layer having a twisted angle $\phi$ and a half residual phase $\alpha$ depending on an external electric field; the liquid crystal layer comprising a middle layer and at least one boundary layer, wherein a total residual phase of the liquid crystal cell satisfies the following relation $\alpha = 2\pi \cdot \psi/\lambda$; wherein $\psi$ is a residual retardation of each boundary sub-layer and $\lambda$ is a wavelength of light;
   a compensation film disposed on the liquid crystal cell and on an ambient light entrance side, and having a phase retardation $\delta$ in the range of $(\delta_0-0.2\pi) \leq \delta \leq (\delta_0+0.2\pi)$ and a slow axis angle $\theta$ in the range of $0° \leq \theta \leq 180°$; and
   a polarizer disposed on the compensation film and having a polarizer angle $\beta$ in the range of $(\beta_0-20°+n\cdot 90°) \leq \beta \leq (\beta_0+20°+n\cdot 90°)$;
   wherein the compensation film is sandwiched between the polarizer and the liquid crystal cell,
   wherein the phase retardation $\delta_0$ satisfies the following relation:

$$\delta_0 = \mathrm{atan}\left(\frac{\sin^2\phi + \cos 2\alpha \cos^2\phi}{\sin\alpha \sin 2\theta \sin 2\phi + \sin 2\alpha \cos 2\theta \cos^2\phi}\right); \text{ and}$$

wherein n is an integer with $\beta_0$ satisfies the following relation:

$$\beta_0 = \theta + \frac{1}{2}\mathrm{atan}\left(-\frac{\sin^2\phi + \cos 2\alpha \cos^2\phi}{\sin\delta_0(\sin\alpha \cos 2\theta \sin 2\phi - \sin 2\alpha \sin 2\theta \cos^2\phi)}\right).$$

8. The liquid crystal display of claim 7, wherein the opposing reflective substrate comprises a transflective substrate.

9. The liquid crystal display of claim 7, further comprising a broadband circular polarizer disposed beneath the transflective substrate.

* * * * *